United States Patent
Hall et al.

(10) Patent No.: US 10,462,054 B2
(45) Date of Patent: Oct. 29, 2019

(54) OVERLOADING ADDRESS SPACE FOR IMPROVED ROUTING, DIAGNOSTICS, AND CONTENT-RELAY NETWORK

(71) Applicant: Trinity Mobile Networks, Inc., New Haven, CT (US)

(72) Inventors: Stephen Donald Hall, Providence, RI (US); Cory Francis Poor Myers, Washington, VT (US)

(73) Assignee: Trinity Mobile Networks, Inc., New Haven, CT (US)

( * ) Notice: Subject to any disclaimer, the term of this patent is extended or adjusted under 35 U.S.C. 154(b) by 0 days.

(21) Appl. No.: 15/404,181

(22) Filed: Jan. 11, 2017

(65) Prior Publication Data
US 2017/0230287 A1 Aug. 10, 2017

Related U.S. Application Data
(60) Provisional application No. 62/290,986, filed on Feb. 4, 2016.

(51) Int. Cl.
*H04L 12/749* (2013.01)
*H04L 29/06* (2006.01)
*H04L 12/721* (2013.01)

(52) U.S. Cl.
CPC ............ *H04L 45/741* (2013.01); *H04L 69/22* (2013.01); *H04L 45/566* (2013.01)

(58) Field of Classification Search
None
See application file for complete search history.

(56) References Cited

U.S. PATENT DOCUMENTS

| | | | | |
|---|---|---|---|---|
| 6,804,237 B1* | 10/2004 | Luo | ...................... | H04L 12/6418 370/392 |
| 2001/0040895 A1* | 11/2001 | Templin | .................. | H04L 29/06 370/466 |
| 2009/0219834 A1 | 9/2009 | Babbar et al. | | |
| 2010/0177689 A1* | 7/2010 | Toyokawa | ........ | H04W 36/0033 370/328 |
| 2012/0207168 A1 | 8/2012 | Kassi Lahlou et al. | | |
| 2013/0070745 A1 | 3/2013 | Nixon et al. | | |

(Continued)

FOREIGN PATENT DOCUMENTS

| | | |
|---|---|---|
| EP | 17747073.9 | 12/2018 |
| JP | 2011019007 A | 1/2011 |

(Continued)

OTHER PUBLICATIONS

Request for Comments: 3056; Network Working Group, B. Carpenter, K. Moore, Feb. 2001.*

(Continued)

*Primary Examiner* — Alex Skripnikov
(74) *Attorney, Agent, or Firm* — Siritzky Law, PLLC

(57) ABSTRACT

A device includes hardware, including at least one processor and a memory, the device operable in a packet network, the device constructed to: (a) receive an internet protocol (IP) packet, said IP packet including at least address information and other information distinct from said address information, wherein said address information is sufficient to identify at least one device in said packet network; and (b) route or consume said IP packet based on said address information and on said other information.

35 Claims, 18 Drawing Sheets

(56) References Cited

U.S. PATENT DOCUMENTS

| | | | |
|---|---|---|---|
| 2014/0328300 A1* | 11/2014 | Luo .................. | H04W 8/08 |
| | | | 370/329 |
| 2015/0350074 A1 | 12/2015 | Chen et al. | |
| 2016/0142308 A1* | 5/2016 | Gage .................. | H04W 4/70 |
| | | | 370/392 |

FOREIGN PATENT DOCUMENTS

| | | |
|---|---|---|
| KR | 10-2018-7025570 | 11/2018 |
| WO | PCT/IB2017/050231 | 8/2017 |

OTHER PUBLICATIONS

WIPO, PCT/IB2017/050231, International Preliminary Report on Patentability Chapter I, dated Aug. 7, 2018 [12 pgs.].

WIPO, PCT/1B2017/050231, International Search Report, dated Apr. 25, 2017 [4 pgs.].

WIPO, PCT/1B2017/050231,Written Opinion of the International Search Authority, dated Apr. 24, 2017 [11 pgs.].

Espacenet Patent Abstract ofJP2011019007A, Jul. 7, 2009, Nec Corp. Method, device, system and program for avoiding network address overlap.

IETF RFC 2460: "Internet Protocol, Version 6 (IPv6) Specification," Network Working Group, Request for Comments 2460, Dec. 1998 [available at https://tools.ietf.org/pdf/rfc2460.pdf].

IETF RFC 791: "Internet Protocol," Network Working Group, Request for Comments 791, Sep. 1981, DARPA Internet Program Protocol Specification, by Information Sciences Institute for Defense Advanced Research Projects Agency [available at https://tools.ietf.org/pdf/rfc791.pdf].

* cited by examiner

IPv4 ADDRESS

BYTES

HEX    7F    00    00    01

STRING REPRESENTATION: 127.0.0.1

IPv6 ADDRESS

BYTES

HEX    20   01   0D   B8   AC   10   FE   01   00   02   5A   9F   F2   34   96   0A

STRING REPRESENTATION: 2001:0DB8:AC10:FE01:0002:5A9F:F234:960A

*FIG. 1*

OVERLOADING ADDRESS SPACE FOR IMPROVED ROUTING, DIAGNOSTICS, AND CONTENT-RELAY NETWORK

RELATED APPLICATION

This application claims the benefit of U.S. Provisional Application No. 62/290,986, filed Feb. 4, 2016, titled "Overloading Address Space For Improved Routing, Diagnostics, And Content-Relay Network," the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

INCORPORATION BY REFERENCE

The following documents are hereby fully incorporated herein by reference for all purposes:
(1) IETF RFC 2460: "Internet Protocol, Version 6 (IPv6) Specification," Network Working Group, Request for Comments 2460, December, 1998 [available at https://tools.ietf.org/pdf/rfc2460.pdf];
(2) IETF RFC 791: "Internet Protocol," Network Working Group, Request for Comments 791, September, 1981, DARPA INTERNET PROGRAM PROTOCOL SPECIFICATION, by Information Sciences Institute for Defense Advanced Research Projects Agency [available at https://tools.ietf.org/pdf/rfc791.pdf].

BRIEF DESCRIPTION OF THE DRAWINGS

Objects, features, and characteristics hereof as well as the methods of operation and functions of the related elements of structure, and the combination of parts and economies of manufacture, will become more apparent upon consideration of the following description and the appended claims with reference to the accompanying drawings, all of which form a part of this specification. None of the drawings is to scale unless specifically stated otherwise.

FIG. 1 depicts aspects of a comparison of the IPv4 and IPv6 address spaces;

DETAILED DESCRIPTION OF THE PRESENTLY PREFERRED EXEMPLARY EMBODIMENTS

Glossary, Definitions, and Abbreviations

Figure 2:
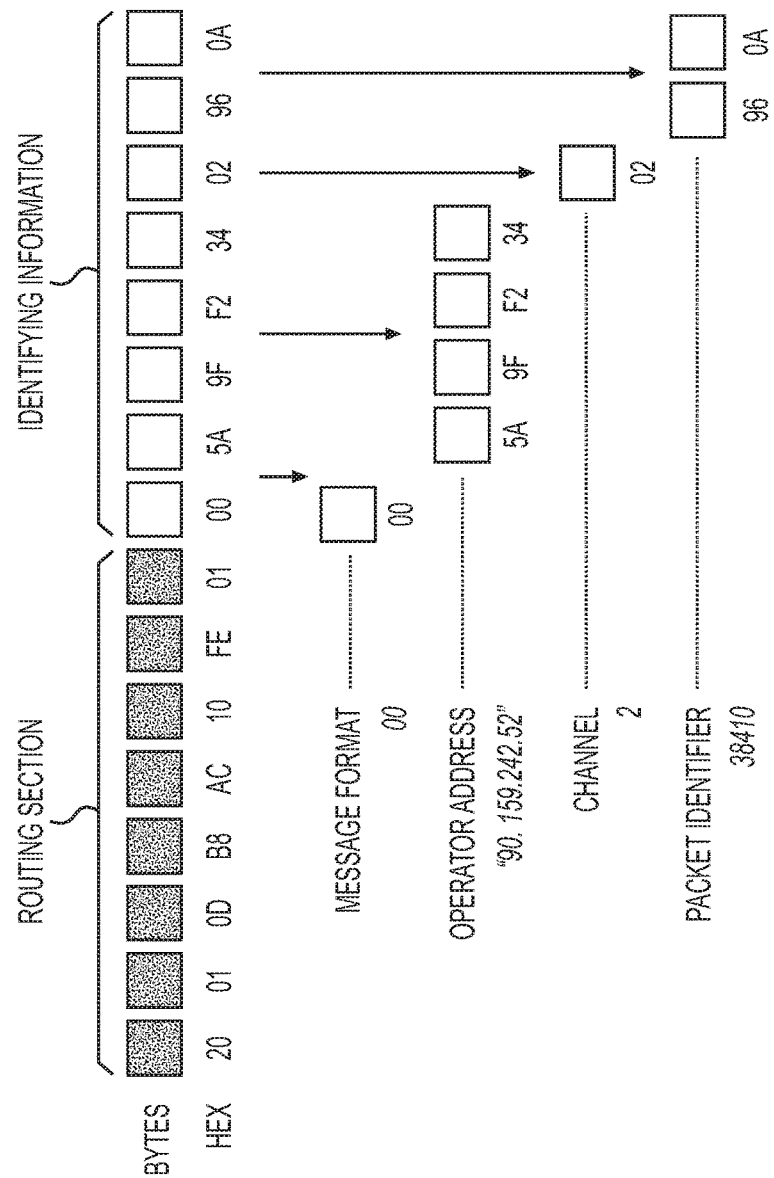
FIGS. 2 and 3 depict aspects of exemplary interpretations of the IPv6 address space according to exemplary embodiments hereof.

As used herein, unless used otherwise, the following terms or abbreviations have the following meanings:

API means application programming interface;

BGP means Border Gateway Protocol, a protocol by which routers advertise the networks for which they can route traffic;

Bonjour refers to Apple Computer's implementation of zero-configuration networking, a group of technologies that includes service discovery, address assignment, and hostname resolution;

GPS means Global Positioning System;

IP means Internet Protocol;

IPv4 means Internet Protocol Version 4;

IPv6 means Internet Protocol Version 6;

IP address means an address used in the Internet Protocol, including both IPv4 and IPv6, to identify electronic devices such as servers and the like;

TCP means Transmission Control Protocol;

LAN means local area network;

MAC means Media Access Control;

MTU means maximum transmission unit and is the largest size packet or frame that can be sent in a packet- or frame-based network such as the Internet;

NAT means Network Address Translation;

a "netblock" refers to a continuous range of IP addresses;

RAM means random access memory;

RF means radio frequency;

TCP/IP means the Transmission Control Protocol/Internet Protocol;

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

As understood by those of ordinary skill in the art a packet and a frame are both packages of data moving through a network. Frames exist at Layer 2 (the Data Link Layer) of the OSI (Open Systems Interconnection) Model, whereas packets exist at Layer 3 (the Network Layer, e.g., the IP layer) of the OSI Model. A packet is typically encapsulated into one or more frames and forms the data part of the frame(s). Thus, as used herein, a "packet" generally refers to the encapsulated unit of the network layer of the OSI model, and a "frame" generally refers to the encapsulated unit of the data link layer.

As used herein, the terms "IP frame" or "IPv6 frame" refer to or comprise IP packets.

A routing device refers to and means a networked device that routes IP packets.

"Identifying information" means information or data that may be used when making a routing decision, but that is not required for routing to occur. Identifying information may be encoded into the address space of an IP address to provide additional information than that which would be typically encoded in the address space as an IP address. For the purposes of this description, an IPv6 address may be considered to comprise address information and other information. The IPv6 address information contains the minimum information required for routing (64 bits, generally the first 64 bits). The other 64 bits (generally the last 64 bits) comprise the "identifying information."

BACKGROUND

The standardization and proliferation of devices supporting Internet Protocol version 6 (IETF RFC 2460) has begun to solve fundamental issues with IPv4 networks and the IPv4 protocol design (IETF RFC 791). IPv6's expanded address space provides enough unique addresses to serve the billions of devices currently connected to the Internet with ample address space to spare for other uses.

Extensions to the new standards have been developed to maintain backwards compatibility with IPv4 networks. This provides a way for gateways to allow legacy devices to inter-operate inside IPv6 networks. Gateways in these systems can provide the necessary translations between an external IPv6 network and an internal IPv4 subnetwork. This functionality is a beneficial feature to allow IPv6 networks to be adopted gradually and with limited upfront costs.

Although the primary motivation driving IPv6 adoption is the capacity to uniquely identify all devices and services on the Internet with their own IPv6 addresses, little has been done to take advantage of the full 128-bit IPv6 address space. This is especially true in the context of multi-hop, relayed, proxied, and virtualized IP networks.

A generally accepted encoding practice is to encode an IPv4 address in the last four bytes of the IPv6 address. These so called "IPv4-mapped IPv6 addresses" arbitrarily assign the first 80 bits of the address to zero, the next 16 bits to 1, and the remaining 32 bits to the IPv4 address. As the inventors have realized, and as described herein, the additional address space may be used to provide additional information, e.g., additional routing information, to relaying devices.

In one exemplary application of this capability, it is well known that different components of an integrated service can require different resources in order to handle high workloads. Some components benefit from running on more or faster CPUs, for example; some require large amounts of memory or persistent storage; and others demand faster interfaces to local or remote networks. For this reason, among others, current best practices recommend scaling an integrated service "out" rather than "up"—that is, expanding the service to run across multiple instances, computer systems, clusters, or entire networks or sites.

Despite recent advances in methods of sharing processes and data among multiple computer systems, it remains difficult to share a network connection among multiple such systems functioning as (rather than coordinated by and behind) a single endpoint. One obstacle is the document published by the Internet Engineering Task Force and known to the Internet-operations community as Best Common Practice 38 (BCP 38) or Request for Comment 2827 (RFC 2827), which encourages network operators to filter incoming IP traffic with spoofed, or faked, source addresses. Some spoofed traffic on the Internet comes from misconfigured sites, but most comes from maliciously configured sites spoofing traffic, e.g., as part of a denial-of-service attack. These conditions, and the recommendations of BCP 38, constrain operators from spoofing traffic for other, benign purposes.

Nonetheless, a carefully configured service can spoof traffic it wishes to redirect within its own site, or to another site controlled by its operator, in order to provide a content-relay network for remote resources, including those already served by a content-delivery network, to its client nodes. This allows for better scaling inside a centrally managed IP network. Utilizing the additional IPv6 address space provides a mechanism for building such a system.

To improve the efficiency and adoption of multi-hop networks, support virtualized network functions, and provide a means for scaling large networks in parallel across multiple devices, an improved network layer model is needed. The model described herein includes a better utilization of the IP address space, particularly in IPv6, to better inform routing and configuration of the network. Furthermore, methods to make use of virtual networks and the IP address space are combined with virtual network interfaces or devices to build more dynamic and scalable networks.

In some aspects, the embodiments hereof provide systems, devices, and methods for conveying information and state in IP networks among devices, virtual interfaces, virtual clients, and virtual networks.

Introduction

In some aspects, exemplary embodiments hereof provide systems, devices, and methods for utilizing the IPv6 address space, routing rules, and relaying devices to improve scaling and configuration in a virtual network. Embodiments hereof support multi-hop networks as a result of the network virtualization. The network may utilize decentralized routing protocols or may incorporate centralized network intelligence when generating routing rules for the network, or determining when packets should be routed inside the network.

In exemplary embodiments hereof, a fixed or dynamic subset of IPv6 address space may be reserved and used for non-routing or pseudo-routing purposes to affect the generation, routing, and/or reception of packets in an IP network. The data included in the reserved address space may include, without limitation, one or more of: identifying information about the next device to receive the packet, characteristics of the transmitting device, the wireless frequency, timing or channel of the next transmission, services available on the transmitting client, and/or other information about the transmitting device or its current network state configuration.

Those of ordinary skill in the art will realize and appreciate, upon reading this description, that with this approach, using a known (pre-defined) subset of the IPv6 address space, existing IPv6 routing protocols and tools will continue to function as they were designed, without modification. Furthermore, certain tools and protocols can make use of the encoded identifying information.

Consider a standard computer operating-system kernel with IPv6 networking functionality. A core premise of IP networks is the ability of a device to route a packet it has received through any internally managed network interface. The device receives the IP packet and can retransmit it to any other networks to which it is connected. Routing rules can be established in the device kernel to route IP packets received from particular addresses or sets of addresses to other addresses in the network. The routing rules for a particular address may also indicate a packet that should be consumed by the receiving device.

When a device receives an IPv6 packet that has additional information encoded in a reserved portion of the IPv6 address space, the device kernel treats the IPv6 packet's IP addresses as standard IPv6 addresses. As a result, the device kernel may be configured with different routing behavior depending on the identifying information encoded in the address of the received IPv6 packet.

As a non-trivial example, a set of IPv6 routing rules are created such that IP packets received by the device are retransmitted on different wireless channels, depending on the information encoded in the reserved address space.

In a centralized multi-hop network, the central server may manage or modify the routing rules for clients by encoding the routing information inside the reserved address space. In this model, the centralized node modifies the destination IPv6 address' reserved space by including the wireless transmission channel of the next transmission. The receiving client is configured with standard IPv6 routing rules to route the packet to one or more network or virtual network interfaces such that the IP packet is transmitted on the channel intended by the central node.

The encoding of non-routing or pseudo-routing information in the surplus IPv6 address space also allows the transmission of state information between endpoints that may be used, e.g., when switching or managing a session. Consider for example an application in which multiple transport protocols are interchangeable in a given stream of IP packets. The reserved IPv6 address space of the IP packets may be used to convey state information between endpoints, notifying each device of the current state of the transport layer or session. This enables routers and relaying devices to prioritize certain packets (and thus transport streams) based on their constituent packets' IPv6 addresses alone.

Additionally, according to some exemplary embodiments hereof, multiple relaying or proxying servers in a centralized network may utilize the reserved address space or other network layer configurations to reconfigure and hand off a data stream between one or more servers.

Encoding information inside IP address space is beneficial over alternative methods in several circumstances. One common alternative for sending network state or reconfiguration information between endpoints is to send that information inside another IP packet, possibly to another IP address, network interface, or a different system. The disclosed approach to encoding information into the IP address space of the destination or source IP address provides per-packet routing instructions that are immediately available to the routing device that received the packet. When the routing device is itself the recipient of the packet, information encoded in the address space is immediately available to the receiving device without the need for additional network infrastructure or additional out-of-band packets that convey network state and reconfiguration.

Unlike reconfiguration techniques that need out-of-band connections or additional IP packets, new routing information can be encoded directly in the packet. When a routing device receives a packet, the information can be immediately extracted and used for routing. This provides for low-latency reconfiguration of the network. Furthermore, when using additional IPv6 packets for network reconfiguration, each of these packets carries an additional IPv6 header. By encoding the routing information inside an address itself, additional packets are not required for reconfiguration of the network. Therefore, the headers of those packets do not decrease the data packing efficiency, decrease the throughput, or increase the latency of the overall stream of packets.

Encoding Non-Routing Information in IPv6 Addresses

Compared to the IPv4 address space, the IPv6 address space is relatively large. A given IPv4 address contains 32 bits. A given IPv6 address contains a total of 128 bits for use in routing an IPv6 packet from its source to its final destination. This additional address space allows for substantially more devices inside of a given network (e.g., the Internet) to be uniquely identified within the space. A comparison of the IPv4 and IPv6 address spaces is shown in FIG. 1.

According to exemplary embodiments hereof, the additional IPv6 space may be repurposed inside a multi-hop or centralized network to provide additional information including, but not limited to, one or more of: the intended path, transmission, virtual interface, MAC address, channel, encryption key or identification, and/or signals from the sender. A subsection of the address space may be assigned for identifying how the remaining sections of the address space should be used or interpreted. Combinations of one or more of these encoded parameters may be used to transmit information to a receiving device as a function, e.g., of the data stream, session, and/or endpoints.

Consider, as an example, a reallocation of the IPv6 address space where the 128-bit address is equally divided into two sections as shown in FIG. 2. As shown in the example in the drawing, the first 64 bits (8 bytes) of the address (the routing section in the drawing) are used for routing the particular packet to the correct destination in accordance with generally accepted IPv6 routing conventions. The remaining 64 bits (8 bytes) of the address space (the identifying information section in the drawing) may be used as described below.

For the purpose of this description, the routing section is described and depicted using the first 64 bits of the 128-bit address, and the other portion is described and depicted using the remaining 64 bits of that address. Those of ordinary skill in the art will realize and appreciate, upon reading this description, that any portion of the address may be used for the routing sections and the other (identifying information) section, as long as devices in the network know which portions of the 128-bit address space correspond to which sections.

The particular scenario described above is generally possible if the virtual network has formally been assigned a block of addresses with a 64-bit prefix. In our example, assume the virtual network operator has been assigned the netblock 2001:0DB8:AC10:FE01/64 by their regional Internet registry or ISP (Internet service provider). It is assumed that all addresses inside that netblock are managed by the virtual network operator and can be statically or dynamically assigned inside the virtual network as they see fit.

In addition to assigning devices inside the virtual network IPv6 addresses inside the netblock through conventional subnetting, the address space may be further subdivided by the operator, e.g., as shown in FIG. 2, to encode an 8-bit message format, a 32-bit operator address, an 8-bit channel, and a 16-bit packet identifier.

In this exemplary configuration, the IPv6 address space in the operator's netblock is now fully assigned. The virtual network can support over 4 billion unique addresses by assigning devices in the virtual network a 32-bit operator address e.g. an IPv4 address. In addition, each packet can now be routed according to a destination channel, and can be universally identified or tagged by an identifier. This identifier may be used, e.g., to convey one or more details about the packet's origin, destination, or information for use when it is routed. The 8-bit message type field allows for different allocations of the address space inside of a netblock. For example, if in the future the virtual network operator must support more than 4 billion devices, a new message type of 1 may be formalized where the operator address is 34 bits (2 extra bits compared to the original operator address), and the channel may be reduced to 6-bits. Using multiple message types allows interoperability of old and new devices' packets when the allocation of the address space is changed.

In this exemplary scenario, devices in the virtual network are not assigned a single IPv6 address. Instead, they are configured to route and consume packets based on the 64-bit prefix, the 32-bit operator address, and identifying information in the header or address.

It should be appreciated that applying this structure to a given subset of the IPv6 address space does not change how the addresses are used in practice. Both source and destination addresses may be used together or separately to encode information in the aforementioned way about a particular IP packet, or using different allocations of the address space.

Example 1: Using a Predefined Channel Field in IPv6 Address Space to Cause Transmission on a Particular Channel Consider the virtual network and operator above who has allocated IPv6 address space from their regional Internet registry according to the exemplary configuration shown in FIG. 2. In this example, the network operator manages a network of wireless access points (gateways) that are connected via cable or fiber to the operator's data center. Each access point is configured to receive traffic in the 2001:0DB8:AC10:FE01/64 netblock, and is assigned a 32-bit operator address.

When the operator's data center wishes to wirelessly transmit a packet from one of their access points, the operator first determines the 32-bit address assigned to the gateway that will transmit the packet. The 32-bit address can be represented, e.g., in dot-notation as 90.159.242.52.

Before the packet leaves the data center, an IPv6 header is added (e.g., prepended) to the packet. The source address in the IPv6 header is the IPv6 address of the originating device in the data center. The destination address is generated by combining the netblock prefix, the target gateway's 32-bit address (in this example, 90.159.242.52), and the intended channel of the transmission (2), as follows:

| | |
|---|---|
| Netblock Prefix | 2001:0DB8:AC10:FE01 |
| Message Format | 0x00 |
| Address | 0x5A9FF234 |
| Channel | 0x02 |
| Identifier | 0x960A |
| IPv6 Destination Address | 2001:0DB8:AC10:FE01:005A:9FF2:3402:960A |

The packet leaves the data center with an IPv6 destination address of 2001:0DB8:AC10:FE01:005A:9FF2:3402:960A.

For simplicity, it is assumed that the data center also maintains a list of the MAC addresses of their deployed wireless access points. This facilitates sending the IPv6 packet directly to the intended recipient using a suitable link-layer protocol such as Ethernet.

The wireless access point receives the IPv6 packet and matches the first 64-bits to the operator's netblock as a conventional IPv6 routing device would typically do. Unlike the conventional protocol, the access point then looks at the message type, and extracts the 32-bit operator address, channel, and identifier from the IPv6 destination. If the 32-bit address (90.159.242.52 in this example) matches the address assigned to the gateway by the operator (also 90.159.242.52 in this example), the wireless access point re-transmits the packet on channel (2) as indicated in the destination address.

This exemplary implementation provides several benefits. The operator is able to utilize their own addressing scheme inside their virtual network without rewriting the networking stack of devices in the data center or the wireless hardware. Furthermore, the wireless transmission channel is managed per-packet by the data center, without requiring an out-of-band control connection or higher-level protocol. Additionally, the central facility can assign a packet identifier to each packet, in an exemplary embodiment, according to a predetermined sequence. This allows network diagnostic hardware and software to identify networking problems rapidly in the network layer, without relying on sequencing information from the transport layer.

Dynamic Address Space Allocation

It should be appreciated that the method and contents of both source and destination address encodings can be dynamic, as exemplified, e.g., in the message format field in the exemplary address above. Those of ordinary skill in the art will realize and appreciate, upon reading this description, that different and/or other techniques for dynamically allocating the space are possible. For example, an algorithm may determine how the additional address space is used based on one or more environmental or internal factors of the device sending or receiving the packet. For instance, a device might only provide an IPv4 source address in the address space if an IPv4 address is available for the particular device on an IPv4 network. If a suitable IPv4 address is not found, the 32-bits of the address space allocated for an IPv4 address may, instead, encode parts of the source's MAC address among other information.

This method for dynamically utilizing the address space can be further manipulated by the host operating system or hardware of the entity that sends or receives the addressed packets. For instance, a software router that handles IPv6 traffic in the 2001:0DB8:AC10:FE01/64 netblock may be configured to only send or receive traffic matching both its routing criteria (membership in the 2001:0DB8:AC10:FE01/64 netblock) and any particular identifying information. For example, the software router may be configured to only route packets inside its routable address space that have the identifier "38410" or were targeted for channel 2.

Example 2: Routing Packets to Wireless Gateways in a Centralized Network

Consider again the virtual network described above, its operator, and the operator's 64-bit IPv6 netblock assigned by the regional Internet registry.

Figure 3:
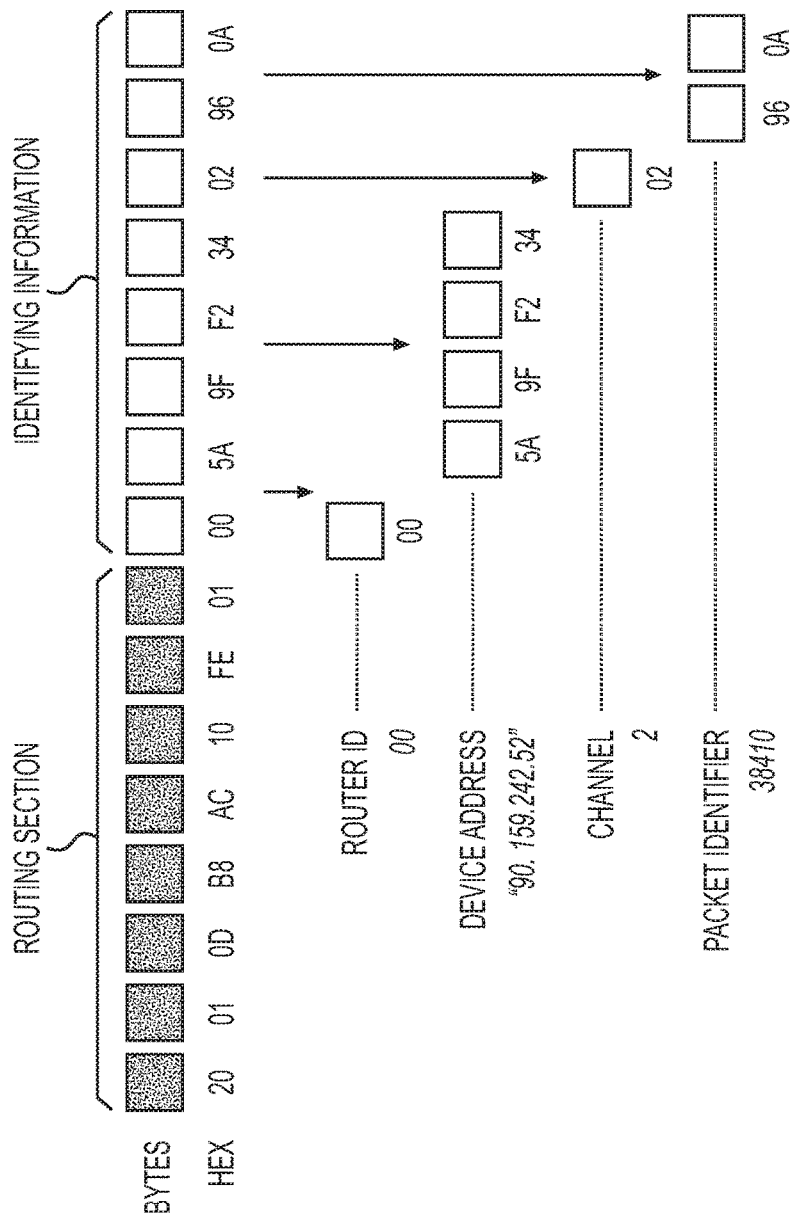

The IPv6 address space may be allocated inside the operator's network, e.g., according to FIG. 3. The allocation of the address space is similar to that of Example 1 (FIG. 2), except the "Message Format" field is replaced with a "Router ID" (router identification) field.

It should be appreciated that for this example the "Router ID" was intentionally assigned as the byte following the routing section. This allows the "Router ID" to be considered part of a 56-bit IPv6 netblock. This smaller 56-bit netblock is a subset of the 64-bit netblock reserved for the operator by the local Internet registry.

The operator thus supports up to 256 routers in this configuration, each capable of routing traffic inside their own individually managed 56-bit (/72) IPv6 address space. The netblock for each router is determined by combining the operator's netblock and the Router identifier:
Router IPv6 Netblock Format
2001:0DB8:AC10:FE01:{RouterID}/72
e.g. with RouterID=1
2001:0DB8:AC10:FE01:01/72

In this scheme, a given router with ID 1 can route packets inside its own 56-bit address space, and receive all packets destined for the 2001:0DB8:AC10:FE01:01/72 netblock.

Figure 4:
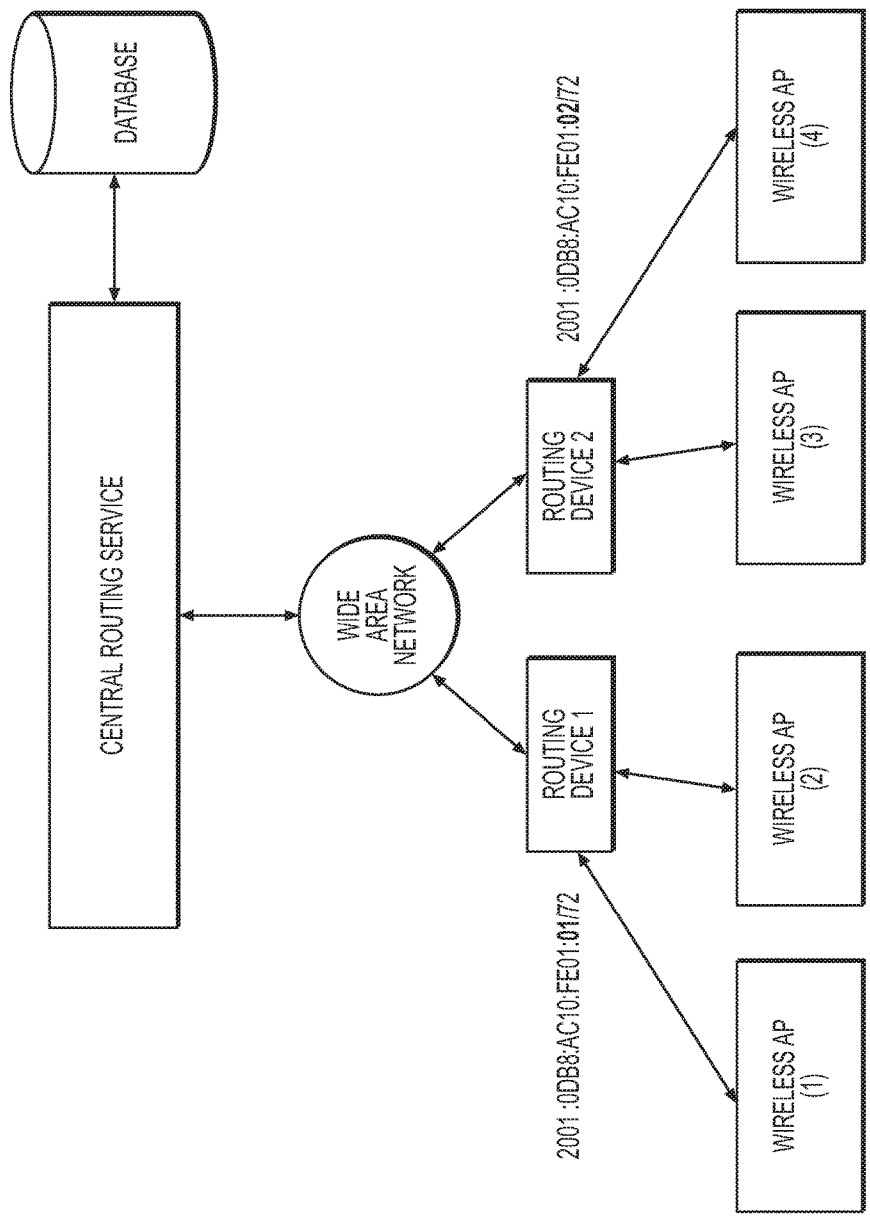
FIG. 4 depicts aspects of an exemplary deployment of wireless access points, data center, and IPv6 routers.

Consider again the virtual network operator's deployment of wireless access points, data center, and IPv6 routers as shown in FIG. 4. In this exemplary configuration, two routing devices are deployed, with a routing identifier of 1 and 2 being assigned to each, respectively. Each router broadcasts to the Internet, e.g., via BGP, the netblock to which it has been assigned in the IPv6 address space according to its ID. The router with ID 1 ("Routing Device 1") for example would announce for itself the netblock 2001:0DB8:AC10:FE01:01/72.

Each of the four wireless gateways in the virtual network is connected to one of the operator's IPv6 routers. At the operator's data center, a database stores the 32-bit operator address assigned to each wireless access point, and the IPv6 address of its router.

When the operator intends to send a wireless transmission over one of the wireless access points, the operator looks up the 32-bit operator address of the intended access point, computes a channel and identifier for the transmission, and looks up the ID of the router. In this example, the IPv6 destination address of the packet is computed by combining the router's netblock, the 32-bit operator address, the channel, and the identifier.

| | |
|---|---|
| Router Netblock | 2001:0DB8:AC10:FE01:01/72 |
| Operator Address | 0x5A9FF234 |
| Channel | 0x02 |
| Identifier | 0x960A |
| Outbound Frame IPv6 Destination Address | 2001:0DB8:AC10:FE01:015A:9FF2:3402:960A |

The source address of the packet is set to the IPv6 address of the data center, the other IPv6 header fields are filled out according to the IPv6 specifications, and the packet is sent out of the data center.

Since the router with ID 1 has broadcast (via Border Gateway Protocol, or some other routing discovery protocol) that it manages the netblock 2001:0DB8:AC10:FE01:01/72, the data center routes the packet with destination address 2001:0DB8:AC10:FE01:015A:9FF2:3402:960A to Router 1 to be routed.

When Router 1 receives the packet, it extracts and compares the operator address in the packet, and routes the packet as a frame via a point-to-point or other link-layer routing protocol to the targeted wireless access point. As above, the targeted access point extracts and compares the operator address to its own internal address. If the addresses match, the access point extracts the channel information from the address. The access point then transmits the packet according to the channel specified by the operator.

As in Example 1, the operator has targeted a specific IPv6 packet for transmission on a particular channel by encoding information in the IPv6 destination address. By use of the IPv6 address space, a router was also introduced that allows for the IPv6 packet to leave the data center, travel over a wide-area network such as the Internet, and still be routed to the access point with information still encoded in the destination address. This is possible because in this example the operator has reserved and announced a known netblock (/64) in IPv6 address space and partitioned it into 256 blocks of (/72) space.

It should be appreciated that the targeting of an access point and channel assignment has taken place without an out-of-band connection to the data center. This scenario improves over the throughput and latency of connection-based methods. Moreover, by placing this information in the destination address of the IPv6 packet, this targeting information has been delivered to the wireless access point without any additional overhead beyond the IPv6 header.

It should also be appreciated that Routing Device 1, upon reception of the packet, can log the channel or identifier, e.g., for diagnostic purposes. Because the packet passes through the router, the router is also capable of logging the identifier. If the identifier was assigned in a known sequence, this provides a mechanism for the router to track transmission errors and, optionally, to report errors to the data center, e.g., for retransmission.

Manipulating Non-Routing Fields During Routing

A routing device is capable of manipulating the non-routing information while the information is routed Similar to the example above, the channel may be updated not in the data center, but during routing, to reflect the wireless channel over which the IP packet was to be transmitted. In this embodiment/implementation, the data center of example 2 does not assign the channel, and instead uses a sentinel value such as (0) for the channel Routing Device 1 of FIG. 4 is configured to assign a channel based on the frequency availability of the router's service area. The router internally computes the channel of least interference and modifies the destination address' Channel field before routing to the access point. In this scenario, the data center assigns a target wireless gateway, the router assigns the channel, and the intended access point performs the transmission. All the information necessary is communicated between devices by encoding that information in the IPv6 address.

In the case of a multi-hop route where multiple wireless channels are used, the channel may be updated between Device 1 and Device 2 with a particular channel (C1) and then be updated when Device 2 routes the packet to Device 3 over channel (C2). Those of ordinary skill in the art will realize and appreciate, upon reading this description, that the identifier and any other non-routing information can also be modified as the packet is routed through a particular routing device.

When sending an IPv6 packet, a routing device may be capable of retrieving information relating to the device itself, the network, and/or the virtual network to which it is a member. Upon routing an IPv6 packet, a routing device may, for example, query its own IPv4 address and encode it inside the designated identifying information section of the IPv6 address space. When the packet was routed inside an IPv6 network, the receiving device determines the sender's IPv4 address without having to query the sender. A similar method is used to signal to the sender information about the receiver based on the reply stream of packets.

Encoding Service Availability in IPv6 Addresses

Service discovery on computers and mobile devices typically requires an exchange of information or the receipt of transport-layer packets or dedicated IP packets to achieve service discovery with technologies such as Bonjour via multicast DNS. In wireless environments where spectral, power, and retransmission costs are high, improved efficiency during service discovery is highly beneficial. The non-routable IPv6 address space can be reserved for primitive service discovery in situations where packets are already being routed through a device. Identifying information such as whether the source device has a stable internet connection, whether the device currently supports a particular routing service or capability, and the higher level protocols the device supports can all be communicated to one or more receiving devices by using different IP addresses where the identifying information in the address encodes service discovery information.

This information is particularly useful in wireless environments where two wireless devices such as a mobile phone and a gateway may be exchanging IPv6 packets. The gateway device may encode information in the reserved non-routable address space as an indicator of how many devices are currently connected to the Wi-Fi gateway and whether other gateways in the area are present. This information is then used by the receiving device to decide whether to remain connected to this access point or disconnect and try another access point. This situation may arise, e.g., if too many devices were currently connected. Unlike current solutions such as the 802.11 standards and Hotspot 2.0 that require link-layer (MAC) support for such functionality, the disclosed method is compatible with all IPv6 standards-compliant devices and gateways, and may be implemented as a software upgrade in most cases.

Furthermore, a nearby device that had not yet associated with the given wireless gateway can receive the IP packets exchanged between the base station and the mobile device. The nearby device then uses the information encoded in the reserved IPv6 address space to determine whether to connect to the gateway.

Using Tokens for Topology Detection

In another exemplary embodiment hereof, a nearby device in the scenario described above collects the routable and non-routable data exchanged by two or more devices in the network by way of information encoded in IP addresses. This information is collected by passively listening or "sniffing" on the network for other devices. This information is aggregated on the device and relayed to a central management facility to inform routing and network decisions or to build a map of the network.

For example, if the wireless gateway above used the reserved IPv6 address space to indicate the number of devices currently connected to the network, a nearby device receiving that information would record and report that information to the server. In addition, the device could also store and report to a central facility the address information of the nearby peer device(s).

Those of ordinary skill in the art will realize and appreciate, upon reading this description, that this procedure preferably takes place on a per-packet basis, and after averages, thresholds, and other filtering techniques have been applied. An indicator of a network's connection strength, throughput, error rate, packet loss, and a host of other factors can be derived by the listening device and reported to the central facility. Such constant monitoring also provides an indication of nearby devices in the network and how those devices perceive their network conditions.

Security Through Encoding MAC Address in IPv6 Address

In other exemplary embodiments hereof, the reserved IPv6 routing space encodes the 6-byte Media Access Control (MAC) address of the source or destination device. By encoding a MAC address inside the IPv6 reserved address space, a device is now capable of comparing both the source IP address as well as the source MAC address of the device to prevent against spoofing or man-in-the-middle type attacks.

Using the same techniques instead for identification purposes, a MAC address is made publicly available to other devices where software otherwise prevents the MAC address from being provided. In this scenario, a gateway encodes the MAC address of the device to which it is communicating inside the reserved address space of the IPv6 packet. A mobile device connected to the gateway may have no API to retrieve the MAC address of its hardware. This is quite common when the MAC address is randomized by the mobile operating system, e.g., for security purposes. If the mobile device software has no way of retrieving its actual MAC address, the raw IP packets from the gateway can be used to provide this information to the client. The IPv6 reserved address space is used by the gateway to communicate the MAC address of the device to an application on the mobile device without changes to the SDK. This is accomplished by the gateway detecting the MAC address of the device to which is it connected and encoding the MAC address in the reserved IP space of incoming packets.

Encoding Path Information in Reserved IPv6 Address Space

According to exemplary embodiments hereof, particularly in a multi-hop network, the reserved IPv6 address space is used to adjust or better inform the routing decisions of a routing device. Conventionally the destination IP address itself is sufficient for routing an IP packet through a routing device to another device in the network. According to exemplary embodiments hereof, the address contains both the information necessary to route the information to an IP device in the same network and supplementary information that would indicate how the information should be routed to the destination.

These transmission details may include the transmission channel, data rate, modulation, or a buffering or acknowledgement capability where the packet should be acknowledged upon successful receipt by the destination device.

Example 3: Encoding Multi-Hop Transmission Details in Unused IPv6 Address Space

Figure 5:
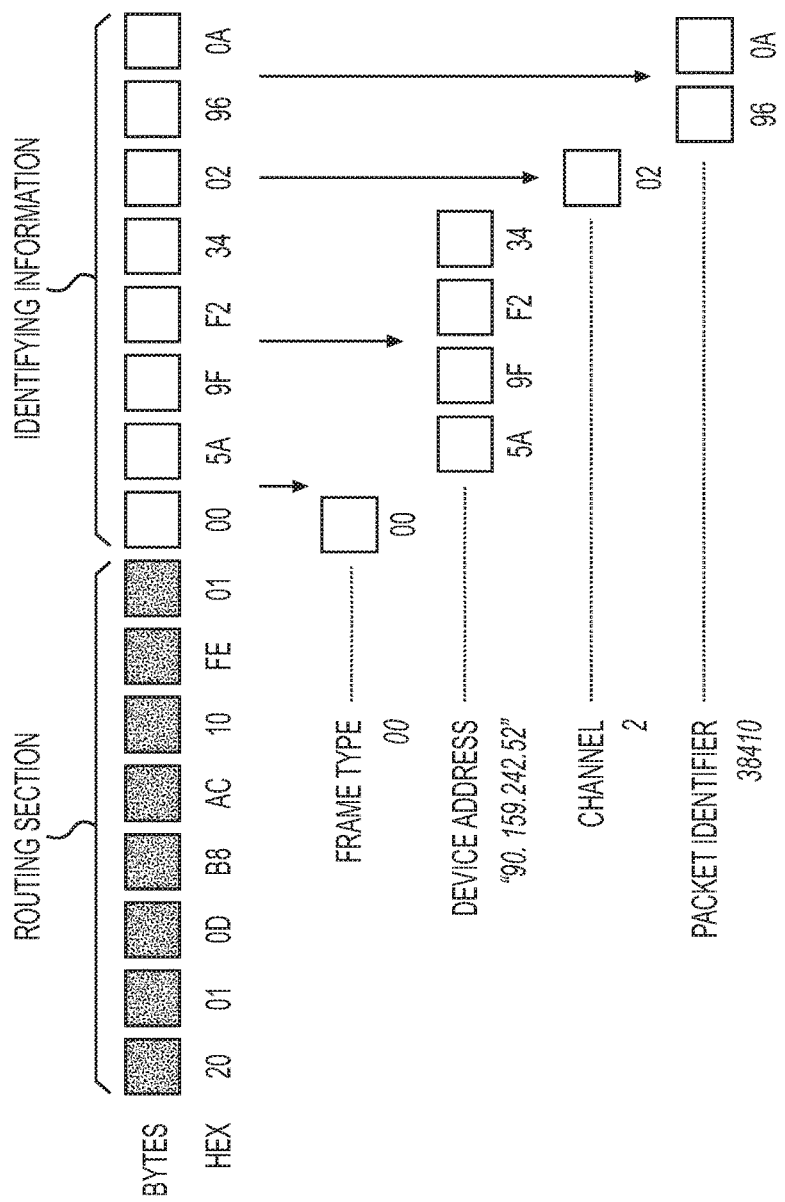
FIG. 5 depicts aspects of an IPv6 addressing scheme according to exemplary embodiments hereof.

Consider the IPv6 addressing scheme of FIG. 5 where the first 8 bytes of the IPv6 address are reserved for traditional IP routing and the remaining 8 bytes of the address are reserved and used for conveying transmission details to the relaying device about how the packet should be handled.

In such a scheme, a centralized routing service takes advantage of the reserved IPv6 address space to provide transmission information to a relaying device for each packet routed. Relaying devices receive the information encoded in the reserved address space of the IPv6 packet and use that information to route the packet.

Figure 6:
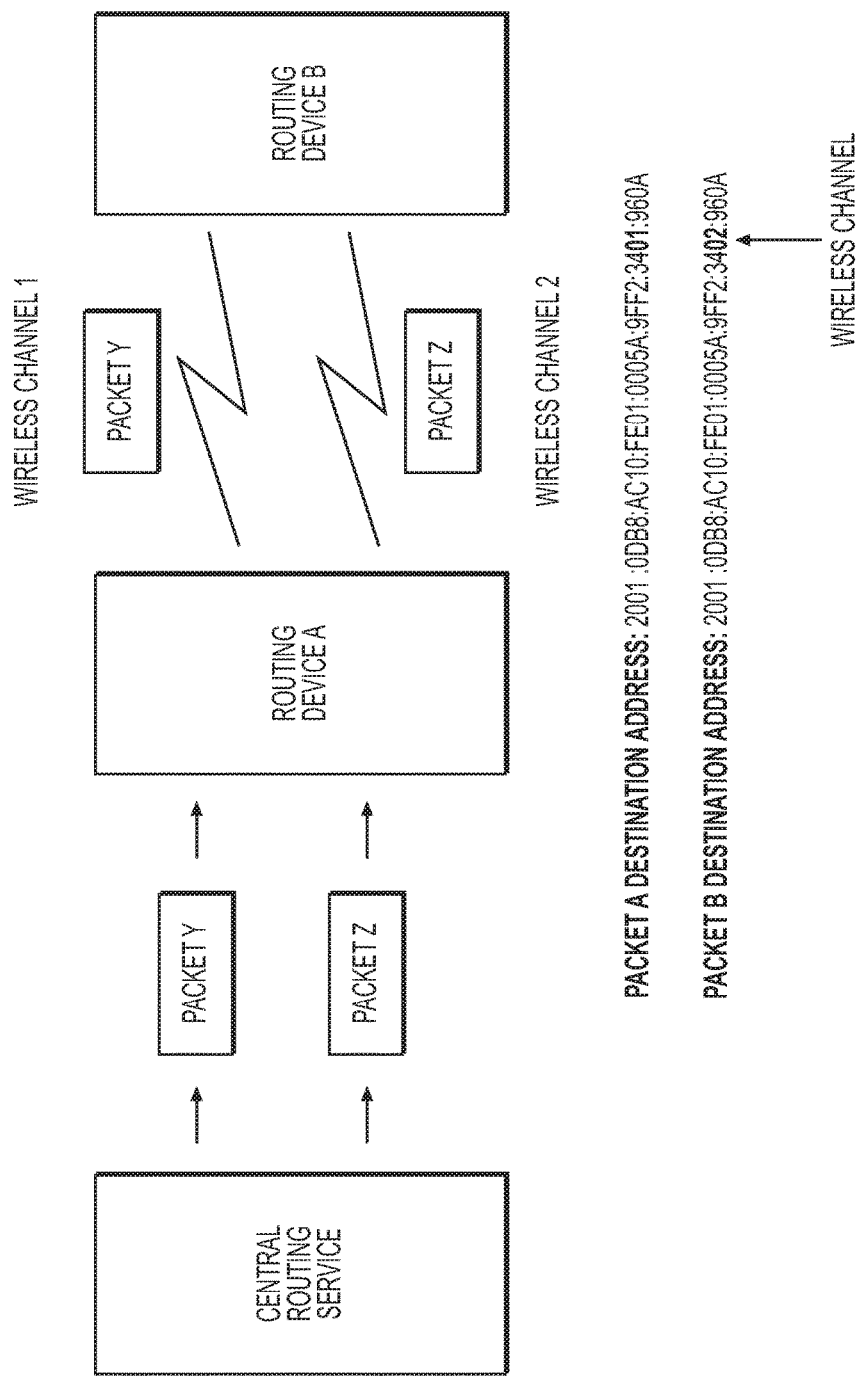
FIG. 6 depicts aspects of routing according to exemplary embodiments hereof using the addressing scheme of FIG. 5.

This scheme is shown in FIG. 6 where a central routing service transmits Packet Y and Packet Z to Routing Device A. Packet Y and Packet Z have different destination addresses but are transmitted inside the 2001:0DB8:AC10: FE01/64 netblock such that Routing Device A receives all packets routed in that block.

As shown in the diagram in FIG. 6, when Routing Device A receives Packet Y or Packet Z, the device extracts the operator's intended wireless channel for transmission from the Channel field in the address. In this example, the seventh octet of the address encodes the channel number over which Routing Device A should transmit the packet.

Schemes for Fragmenting

Another routing scheme according to exemplary embodiments hereof involves fragmenting an IP packet upon instruction from the centralized routing service. This capability allows a centralized routing service to decide where and how an IP packet would be fragmented through fragmentation instructions or a fragmentation format provided in the reserved IPv6 address space.

Figure 7:
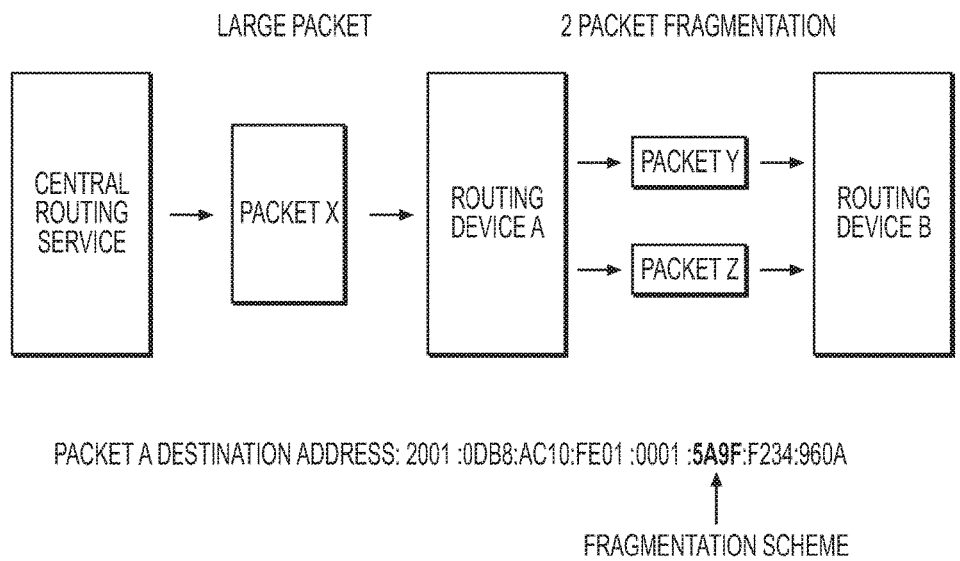
FIG. 7 depicts aspects of routing according to exemplary embodiments hereof.

Example 4: Encoding Fragmentation Instructions in IPv6 Address Space for Multihop Routing Consider a central routing service shown in FIG. 7 that sends a large IPv6 packet (Packet X) to a routing device (Routing Device A). In this example, the central routing service uses the sixth octet of the reserved space in the destination IPv6 address of the packet to indicate that the packet should be fragmented.

When Routing Device A receives a packet from the Central Routing Service, the routing device extracts the fragmentation scheme from the IPv6 destination address of the packet and fragments the packet into two new packets (Packet Y and Packet Z).

Routing Device B receives Packet Y and Packet Z independently. This fragmentation scheme (0x5A9F) allows the central routing service to optimize for both higher data throughput between the central facility and Routing Device A, and lower error rates between Routing Device A and Routing Device B.

Those skilled in the art will realize and appreciate, upon reading this description, that multiple methods, techniques, and strategies for fragmenting IP packets may be used to indicate how a packet should be routed. Some non-limiting examples of these methods, techniques, and/or strategies include one or more of minimizing packet collisions, maximizing throughput, and minimizing wireless interference.

Encoding Virtual Routing Information

In other exemplary embodiments hereof, the reserved address space is used to encode virtual routing information for a particular packet. In this scenario, a virtual interface identifier, a transaction or identification number, or other identifying parameters are encoded into the source or destination address to indicate how a packet is routed. It should be appreciated that this information may incorporate routing details specific to a non-IP network or a virtual subnetwork.

This scheme is useful when a routing device employs one or more virtual network interfaces that must be remotely configured. In this scenario, a central routing server encodes both instructions and a targeted virtual interface identifier into the IPv6 addresses of the packet.

Example 5: Encoding Virtual Interface Information in the IPv6 Address

Consider a scenario where Routing Device A has two network interfaces; one interface is a standard network interface and the other is a virtual network interface.

Figure 8:
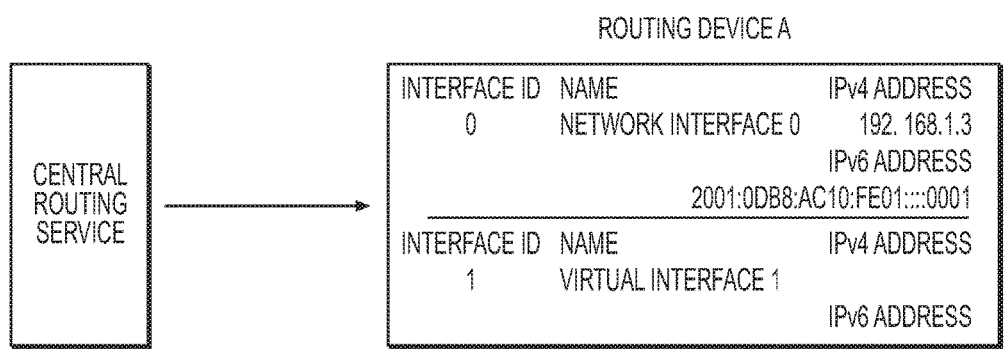
FIGS. 8-10 depict aspects of network and device routing states and procedures according to exemplary embodiments hereof.

Consider as well the exemplary network and routing scheme shown in FIG. 8. The network includes a central routing service and a routing device. The routing device manages two network interfaces. Network Interface 0 can receive packets from the central routing service using its IPv6 address 2001:0DB8:AC10:FE01::::0001. The second network interface is virtual, and cannot reach the central routing service. The virtual interface is not assigned an IPv4 or an IPv6 address, as is typical of a virtual device having just been created.

Suppose the central routing service intends to assign an IPv4 address to a virtual interface. Absent a service to assign virtual interfaces with IP addresses, the central routing service encodes the intended address in IPv6 packets sent through another network interface.

In this example scenario, the IPv6 destination address of a packet received by the Network Interface 0 of Routing Device A encodes the intended IPv4 address of Virtual Interface 1.

Figure 9:
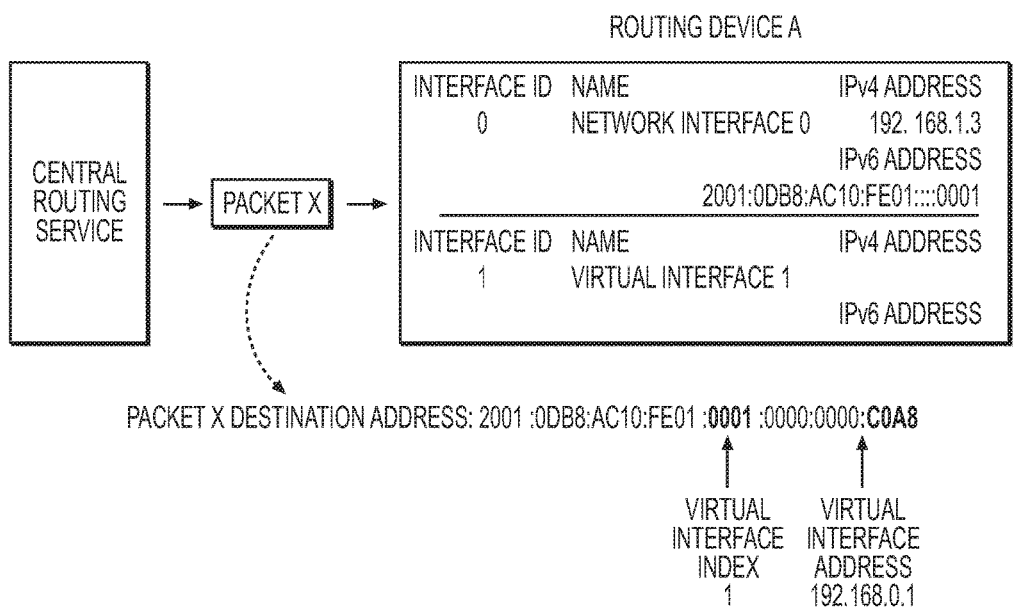

As shown in FIG. 9, the exemplary central routing service sends an IPv6 packet (Packet X) to Routing Device A via Network Interface 0. Because Routing Device A has been configured to receive all traffic in the 2001:0DB8:AC10: FE01/64 netblock, the routing device will receive all packets in that netblock regardless of the remaining 64-bits of the address.

The virtual interface ID is encoded in the fifth octet of Packet X's destination address. The IPv4 address is encoded into the eighth octet of the IPv6 destination address.

Figure 10:
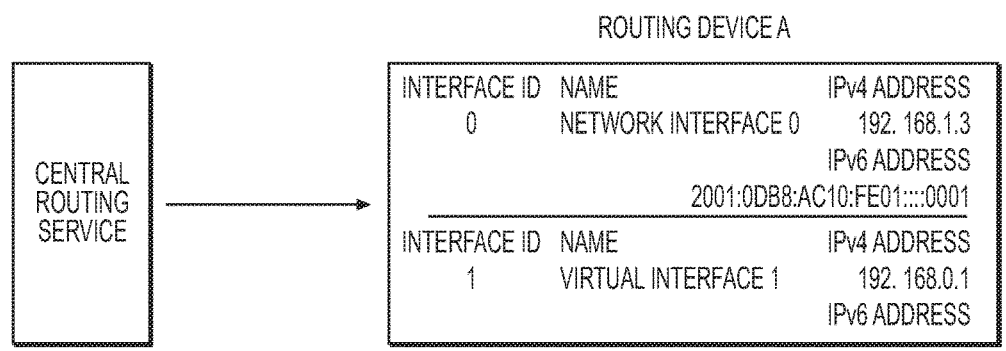

As shown in FIG. 10, the virtual interface index (1) and IPv4 address (192.168.0.1) are extracted from the IPv6 destination address and are used to assign an IPv4 address (192.168.0.1) to Virtual Interface 1, which has index 1 in the device.

This particular scheme allows the centrally managed network to control and manipulate the network interfaces and virtual interfaces of a routing device, including modifying their IP addresses and transmission characteristics. This is accomplished by encoding the virtual interface identifier, addresses, or other transmission characteristics inside the headers of IP packets received by one or more network interfaces. Because the information is encoded in the destination address, the data stream of the packets is unaffected.

Those of ordinary skill in the art will realize and appreciate, upon reading this description, that the manner(s) in which the virtual or network interfaces are identified, the manner(s) in which the information is encoded in the IPv6 address space, the manner(s) in which the routing the device receives IP packets with information encoded, and the manner(s) in which those packets are manipulated will vary according to embodiments and implementations hereof Using the above approach, the Maximum Transmission Unit (MTU) of either interface can, for example, be encoded in the address space in any of the unused octets, and the routing device could manipulate the MTU of the interface without an out-of-band control connection to the central routing service.

IP Routing Rules Using Reserved Address Space

Those of ordinary skill in the art will realize and appreciate, upon reading this description, that by encoding information into a reserved portion of an IPv6 address, the integrity of the address is retained. To a standards-compliant IPv6 routing device, an IPv6 address constructed such that a portion of the address space is reserved for non-routing or identifying data will appear to that device as a standard IPv6 address. This applies to any IPv6 device that has not been configured to make special use of the reserved address space.

As the reserved address space of an address is a convention rather than a property of the address structure itself, an IPv6 standards compliant routing device can be configured to act on IPv6 addresses with or without being configured for the encoding methods used. This is because a routing device can be configured to route packets matching a particular netblock, rather than a particular address.

Furthermore, a routing device need not be aware of the convention or changes in the convention to route IP packets that were created or routed with that convention. Finally, IPv6 routing devices can be configured without modification to the underlying platform, protocols or software to route IPv6 packets that have been created within a reserved address space.

As a result, any standards-compliant IPv6 hardware, software, or tool that has been designed to use IPv6 addresses may also operate seamlessly on an IPv6 address that encodes identifying information.

Figures 11, 12:
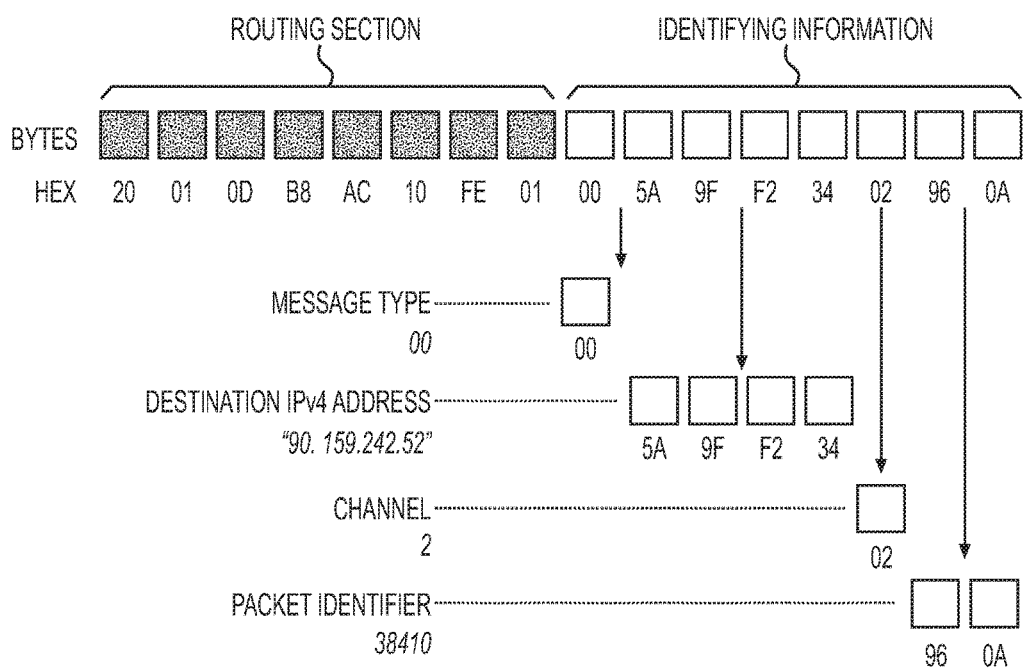
FIG. 11 depicts aspects of a routing device according to exemplary embodiments hereof.
FIGS. 12-13 depict aspects of IPv6 addressing schemes/conventions according to exemplary embodiments hereof.

Consider a routing device such as a Linux-based router and its interface table shown in FIG. 11. The routing table of the device is configured as a standard IPv6 router and can be configured to route any IPv6 packets received by one or more of its network or virtual network interfaces based on the destination IP address of the packet.

A routing rule can be added to the Linux kernel to change the IPv6 routing behavior of the router. In an unmodified IPv6 routing configuration, IP packets received matching the destination of this routing rule will be forwarded (routed) to the matching network interface. For example, an IPv6 packet received by the device with the destination address "2001:0DB8:AC10:FE01:0000:0000:0000:0001" would be routed to Network Interface 0.

Let us now impose an external convention that the IPv6 destination address space is divided into two distinct regions, the routing section and identifying information section as in FIG. 12.

A routing rule can be added to the Linux kernel corresponding to the "2001:0DB8:AC10:FE01/64 netblock such that all packets received matching this prefix are forwarded to a particular address. For example, suppose the routing rule added to the kernel was to forward all packets whose destination address matched 2001:0DB8:AC10:FE01/64 and forward them to "2001:0DB8:AC10:FE01:0000:0000:0001". This would forward all packets received by the routing device to Network Interface 0 when the routing section of the packet's destination address matched the prefix in the rule.

As shown by the example above, by imposing an artificial subnet inside the routing device, Network Interface 0 now receives all packets where the routing section matches this rule. The information contained in the identifier section of the packet passes through to the virtual interface as if to a sub-network.

The originator of an IPv6 packet can now pass information directly to Network Interface 0 by using the following procedure:

Setup

Establish a routing rule in the routing device such that the routing section ("prefix") of the device's address forwards all matching packets to that interface.

Per Frame
1. Generate an IP header where the routing section ("prefix") of the destination address of the header matches the routing section ("prefix") of the destination IP address
2. Encode any interface-specific information into the identifying section of the destination address of the packet.
3. Transmit the packet to the intended address.
4. The routing device receives the packet and routes the packet to the intended network interface by matching the packet to the routing rule.
5. The identifier section of the destination address of the received packet will be encoded with the information from the sender. The network interface can now extract this information from the IPv6 address according to the encoding convention.

In this example, the information encoded in the destination address includes the channel, destination IPv4 address and an identifier. Other information such as, e.g., timing instructions, next hop, virtual or network interface identifier or the address of one or more of the receiving or sending device's interfaces, channel, transmission details, MAC address, and/or other relevant parameters may also be included. In the above example, the encoded information might include the wireless channel on which Network Interface 0 should transmit the data.

Encode Address or Identifier for Next Hop

One particular use for the encoded information is information indicating the address or identifier of the next recipient of the packet. The encoded information may include the destination IPv4 address to use when transmitting the packet over the intended network interface. In the case of a tunneling and/or virtual network interface, the encoded information provides the address, identifier, or protocol to be used when transmitting the packet over that particular interface. This is especially useful when a packet originates inside an IP network and is sent to a recipient in a non-IP network.

Enablement of Multipath Routing

The above approach also makes possible several multipath routing capabilities. Using the above approach, exemplary embodiments hereof provide a way for a central routing facility to send packets simultaneously over Network Interface 0 and Network Interface 1. Because of the routing rule established in the Linux device's kernel, the packets will always be directed to Network Interface 0 as the routing section of each packet is equivalent.

The information contained in identifying section of the destination address would provide a synchronization offset or other identifying information that help reorder or combine a stream of packets and check for integrity. By encoding transport-layer synchronization and acknowledgement information in the IPv6 address space, the transport protocol headers may be reduced and/or eliminated.

In an exemplary implementation, Network Interface A would be substituted by a virtual network interface that was responsible for performing transport layer operations (such as ordering and checks for data integrity) that are normally reserved for the transport layer. Allowing a network interface to perform these functions allows for a more modular device and network stack, and a more dynamic session when employing multipath routing.

In preferred embodiments hereof, the sequence number and/or acknowledgement number associated with the transport layer state of the packet are encoded in the unused IPv6 address space. This enables a routing device to inspect the sequencing or acknowledgement state of the transport layer protocols without inspecting the packet payload. The routing device may then choose to act on the transport layer parameters, cache the packet, retransmit a packet, or take other additional actions.

Centralized Routing Rules

Those of ordinary skill in the art will realize and appreciate, upon reading this description, that when a centralized routing server is present, the centralized routing server creates and manages the routing rules of its particular clients. This allows the routing server to selectively modify the configuration of the network. This modification may include, e.g., determining how an individual node and its virtual interfaces will use the identifying information encoded address of received packets.

Through modification to routes alone, the central routing service can reconfigure not only how data in the network is routed but also how information encoded in the packets informs routing.

Additionally, a centralized routing service might impose multiple routing rules on a particular device. By communicating these routing rules a single time, the routing service can use the destination address of an IP packet to modify parameters of a network interface or routing device.

One common use of such functionality is a central server that establishes a route as in the above example for a wireless interface. The wireless interface is configured to transmit IP packets on the channel indicated in the identifying section in the destination IPv4 address field.

In order to target a packet for a particular channel, the central routing facility makes a single route in the routing device: a route, as above, that causes all packets matching the routing prefix or section of the destination address to be routed through the wireless interface. In such cases, the central routing facility can target a packet for a particular wireless channel by simply changing the channel field in the identifying information section of the destination address of the packet. The network interface will extract the channel from the address and transmit the packet on that channel.

Those of ordinary skill in the art will realize and appreciate, upon reading this description, that wireless channels, timing instructions, synchronization information, or other relevant factors may be used in the identifying information section of the address space by the central facility to route a given IP packet.

Virtual Interfaces to Handle IPv4 and IPv6 NAT

The following section describes some additional network layer capabilities of exemplary embodiments hereof to be used in a virtualized environment. Using the techniques described in the preceding sections, a method can selectively route or reroute packets inside a virtualized network using Network Address Translation (NAT) making use of built-in firewall tools to manipulate packets passing through a virtualized network. The addresses of these packets would contain both routing and non-routing information encoded together in the address. This section further extends these concepts by providing an exemplary method for achieving NAT functionality using virtual interfaces and IPv6 address encoding.

Manual Configuration of Network Address Translation & Encoded IPv6 Addresses

For a particular network, where the IP address space has been reserved into two sections, routing and non-routing as shown, e.g., in FIG. 2, 3, or 5, NAT tools or techniques used on the IP packets received or sent through a particular routing device. Similar to a device kernel, the NAT and packet filter tools such as iptables in Linux or the OpenBSD pf firewall may be used to develop more sophisticated routing rules that act on IP packets where the address space has been reserved. Such tools provide an additional method to manipulate the routing behavior of packets.

A similar technique to the one described above is used to detect packets whose addresses match a particular routing prefix or netblock. Building off the preceding examples, not only can the packets be conditionally routed based on their routing netblock; the addresses can also be manipulated by the NAT tools and routing based on the information in the non-routing section of the address.

Example 6: Channel and Interface-Based Routing Rules Using Information Encoded in the IPv6 Address Consider again an address-space convention where the first eight bytes of an IPv6 address are reserved for routing inside the network and the remaining eight bytes are reserved for non-routing identifying information. Again assume a reserved routing block of 2001:0DB8:AC10:FE01/64. The identifying section of the address space has both a channel and a virtual interface index parameter assigned.

Figure 13:
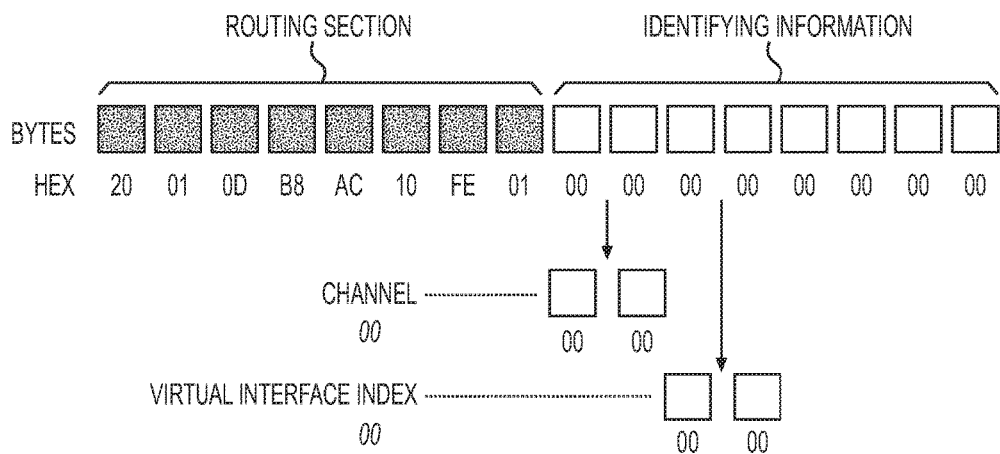
Figure 14:
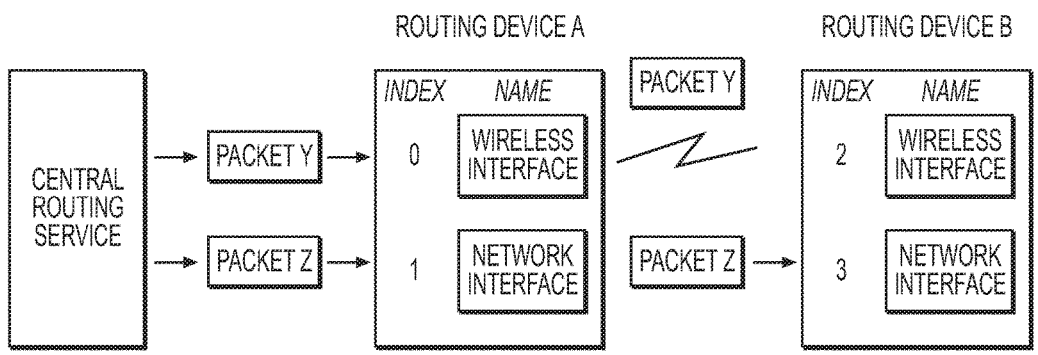
FIG. 14 depicts aspects of an exemplary network according to exemplary embodiments hereof.

Consider a network in which devices adopt the IPv6 address conventions of FIG. 13. Consider too the network of FIG. 14, with a central routing service, two routing devices each with a wireless and a wired network interface.

A routing rule such that Network Interface 1 receives the packets inside the reserved netblock is applied in Routing Device A for Network Interface 1:

route 2001:0DB8:AC10:FE01/64→Network Interface 1

This routing rule should be understood as routing all received packets in the 2001:0DB8:AC10:FE01/64 netblock to Network Interface 1.

Suppose a system administrator has just discovered that Wireless Interface 0 of Routing Device A is experiencing interference on channel 1. In a typical setup, the system administrator might manually configure Wireless Interface 0 in Routing Device A to exclusively use channel 2. In the approach described herein, this can be accomplished by an additional routing rule that acts more specifically on the routing space and the channel space of the address:

route 2001:0DB8:AC10:FE01:0001/80→2001:0DB8:AC10:FE01:0002/80

In the above example, when packets are received in the 2001:0DB8:AC10:FE01/64 netblock where the "channel" parameter in the non-routing section is 0001, the kernel IP tables, packet filtering rules, and/or firewall transform the destination address to 2001:0DB8:AC10:FE01:0002/88 before they are delivered to Wireless Interface 0 for transmission.

It should be noted that the routing rules are applied before the virtual interface receives the packet, and the identifying section of the IPv6 destination address has been modified using conventional IPv6 routing tools. This is possible because standard IPv6 routing tools and filters treat the encoded information as though it were part of the destination address. Thus, information encoded in the IPv6 address space is treated as if it were a subnet in the netblock. It should be appreciated that subnets and netblocks are orthogonal. For example, a subnet may span netblocks, if they are contiguous and managed together.

When Wireless Interface 0 receives the packet after Routing Device A has run the pre-routing rules, the channel parameter in the destination address will be set to 2. Wireless Interface 0 will now transmit all received packets on channel 2, instead of channel 1.

Alternatively, the administrator might create a routing rule such that all traffic routed to Wireless Interface 0 was routed to Network Interface 1, and configure Network Interface 1 as an alternate route for data transmission:

route delete 2001:0DB8:AC10:FE01/64→Wireless Interface 0 route 2001:0DB8:AC10:FE01/64→Network Interface 1

Now, packets received by the routing device with destination address in the netblock 2001:0DB8:AC10:FE01/64 will be routed to Network Interface 1 because the first four octets match the routing rule for Network Interface 1. Network Interface 3 of Routing Device B now receives the packet with address inside the netblock 2001:0DB8:AC10:FE01:0001/88, indicating transmission on channel 1.

It should be appreciated that using this exemplary method, the channel and other non-routing information in the packet has been redirected to Network Interface 1 because it was encoded in the address of the packet and matched a routing rule matching both the routing and identifying section of the address as if it were a standard IPv6 address. Network Interface 1 could repurpose the channel information or simply ignore the information if it was not applicable. For example, if Network Interface 1 provided a wired connection to Network Interface 3 the channel information would be ignored.

This exemplary method provides a mechanism for reconfiguring routes between different interfaces in the network while maintaining the integrity of the identifying information. This method also provides a means for using route reconfiguration to change the behavior of virtual interfaces without issuing commands for interface-level reconfiguration. This is particularly useful because route-management tools and remote network-configuration tools already exist and can now be used to configure additional parameters inside the network. For instance, this enables virtual network interfaces to be developed and deployed remotely, and designed such that the IPv6 packets they route modify their configurations.

In another exemplary use, the aforementioned system administrator intends to transition traffic from Wireless Interface 0 to Network Interface 1. Consider again a network where traffic matching a particular netblock has been routed to Wireless Interface 0:

route 2001:0DB8:AC10:FE01/64→Wireless Interface 0

Now impose, as in FIG. 13, that the sixth octet of the IP address is virtual interface identifying information. For wireless interface 0, assume that the interface information is the hexadecimal number 0x0000. Thus packets of the form 2001:0DB8:AC10:FE01:****:0000/80 are routed to Wireless Network Interface 0, and they also encode the identifier 0x0000 of Wireless Interface with index (0) in the sixth octet, regardless of the channel.

When the administrator intends to transition traffic to Network Interface 1, the above method can be used to modify the identifying information to now match Network Interface 1's identifier 0x0001. Again, one or more NAT routing rules can be used to both route and adjust the identifying information:

Replace packets with identifier 0000 in netblock
    #2001:0DB8:AC10:FE01/64
    # with identifier 0x0001
    route 2001:0DB8:AC10:FE01:**:0000/80→2001:0DB8:AC10:FE01:**:0001/80
    # Route all traffic in the 2001:0DB8:AC10:FE:01:****:0001/80 block
    # to Network Interface 1
    route 2001:0DB8:AC10:FE01:****:0001/96→Network Interface 1

In the above routing rules, the "****" should be understood as a wildcard for the routing rule, which causes the routing rule to accept as a match any address containing any one of the possible values for that section of the address. Lines prefixed with "#" should be considered comments.

Those of ordinary skill in the art will realize and appreciate, upon reading this description, that the use of NAT filtering combined with a reserved address space, enables selective pre- and post-routing rules based on both conventional routing details and identifying information such as channels, virtual identifiers, tokens, and synchronization information. Furthermore, the NAT filtering techniques can be used for modifying an address such that the routing section, the identifying information section, or both have been edited to affect both how a packet is routed, and how a network interface or receiving device should handle the packet.

Virtual Interfaces to Achieve NAT Functionality

The aforementioned NAT capabilities can alternatively be provided using virtual network interfaces assigned to one or more IP addresses, subnetworks, or patterns. In this exemplary method, the responsibilities of the built-in packet filter and NAT tools are divided over several virtual network interfaces. These virtual interfaces are addressed in such a way that the device kernel routes packets to them as if they represent entire netblocks or subnetworks. This information encoded in the address such as a channel, timing offset, or a sequence number is extracted by the virtual interfaces used to finish routing the packet to the destination.

Using the virtual network interface model, the above routing rules can be replicated and additional modularity and customizability is gained. For example, more sophisticated routing rules can incorporate the capabilities and the information available to virtual interfaces, such as operating system parameters or information about a device's hardware. It will be clear to those skilled in the art, upon reading this description, that remote configuration of the routing rules allows a central facilitate to use these methods to dynamically reconfigure a network.

Virtual Interfaces that Perform Computations

Virtual interfaces may perform computations relating to one or more of the IP packets routed to the interfaces. This enables, for example, the creation of a network interface that can compute the average data rate of packets being routed. In addition, when information is encoded in the IP address, this information also becomes available for computation. This enables a virtual network interface to compute the average number of IP packets routed over a particular channel. Upon reading this description, one skilled in the art will realize and appreciate that the device whose virtual interface is routing the traffic need not have a wireless interface to count the number of packets intended for a particular wireless channel. This is achieved because the channel information is encoded in the IP address. Some conventional IPv6 analytics tools can be repurposed to match a set of routing rules and provide or compute this information.

NAT Virtual Interfaces to Bridge Networks

A more sophisticated use of virtual network interfaces inside this scheme occurs when a virtual interface is assigned multiple IP addresses or routes. This enables a virtual interface to act as a de-multiplexer for IP packets, combining different IP streams into a single stream transmitted by the interface.

A common use of such a sophisticated virtual interface is a virtual network bridge that combines packets from multiple networks for the purposes, e.g., of load balancing or other network optimization or functionality. Using a virtual network interface, the complex rules of load balancing and bridging the network are integrated into the virtual interface implementation itself. This enables the rapid deployment and configuration of complex functionality in existing operating systems. In the Linux operating system, for example, a virtual interface can be added through a kernel module loaded from user space instead of having to recompile the device kernel itself.

NAT Virtual Interfaces to Facilitate Transport Layer or Session Transitions

A NAT-capable virtual interface provides the capability to transition between two transport layer protocols. With the proliferation of TCP/IP, most networks rely exclusively on TCP as the transport layer for their reliable communication. Unfortunately, TCP has several drawbacks when used inside of virtual networks and multi-hop networks, as their timing and packet-scheduling priorities differ from those of the common scenarios for which TCP's error handling was designed.

For example, TCP connections are bidirectional whereby the sender and receiver maintain connection state independent of the network layer transporting the packets. In situations where changes in the network layer occur, such as a link drops or when there is sudden interference in a wireless connection, the TCP protocol may recognize this failure as a disconnection rather than a temporary interruption. Alternatively, the TCP protocol will sometimes stall or otherwise be unable to re-establish the connection. A third failure of TCP occurs in virtualized and multi-hop networks where multiple hops of time-varying throughput, error rate, or latency are required for routing. Current TCP algorithms, which were not designed to factor in such changes in the network, can produce bottlenecks. In a mesh network, bottlenecks occurring around the gateways can be an impediment to a seamless user experience and maximizing throughput inside a particular geographic area.

A solution is to make use of new transport protocols that incorporate centralized routing information about the network into the transport protocol itself. Such a protocol would allow for remote customization of the flow control algorithms used, could prevent bottlenecks when they occur, and would better share network resources when they were constrained. One problem with a centralized transport protocol is the enormous overhead required to centralize all information in the network. An ideal solution combines the conventional TCP protocol, a centralized transport protocol, and the ability to seamlessly switch between the protocols for the same stream of data.

The use of NAT virtual interfaces provides a mechanism to transition between both TCP and a custom transport protocol. The NAT virtual interface is configured to receive both TCP packets and the secondary transport protocol's packets. The virtual interface tracks the connection state information related to both protocols. This information is the result of inspecting the headers of the packets passing through the virtual interface. This information is also obtained by extraction of fields from the identifying information encoded into the IP addresses of the packets. The state information is combined with processing logic inside the virtual interface to decide which transport protocol to use when transmitting a given packet.

Figure 15:
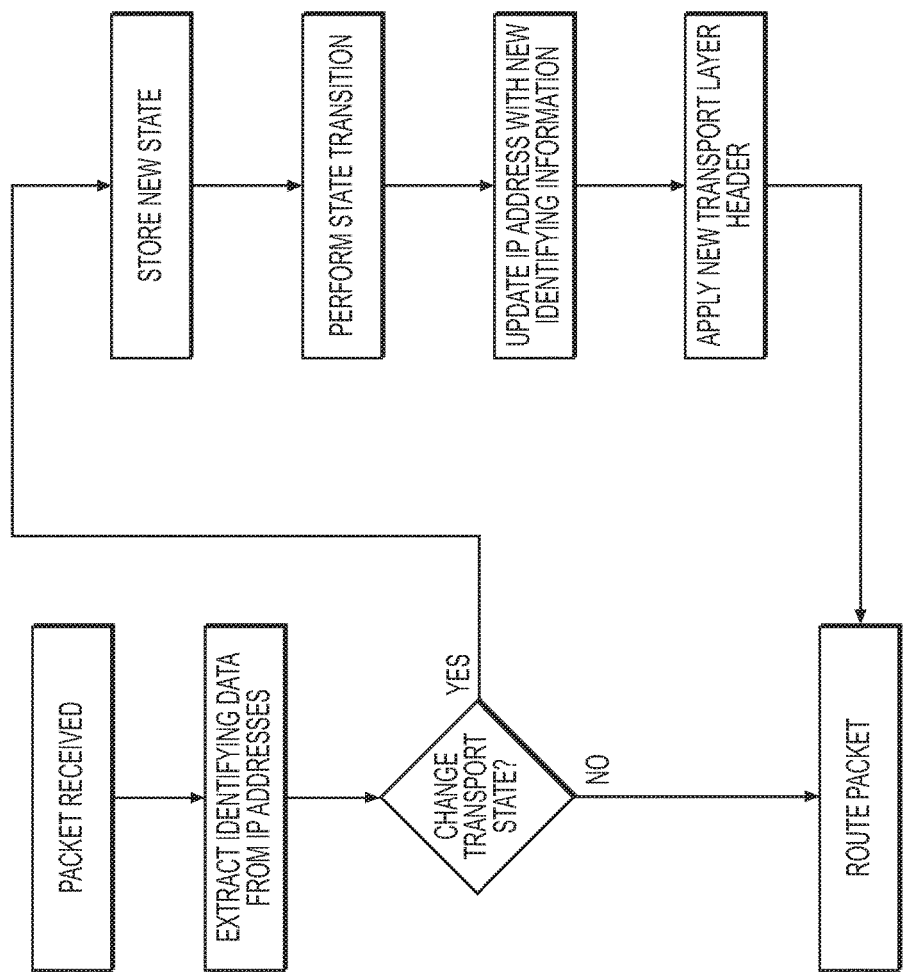
FIG. 15 depicts a flow chart outlining the logic for transport layer transition according to exemplary embodiments hereof.

A flow chart outlining the logic for transport layer transition is shown in FIG. 15. When new packets are received by the virtual interface, information contained in the IP address is used to determine whether the interface should perform a transport layer state change.

The NAT virtual interface is responsible for tracking and maintaining the state of the transition. When a state transition from TCP to the custom transport protocol (or vice versa) occurs, the virtual interface facilitates the transition by recording the state change, performing the transition (which may include closing and/or opening connections on one or both of the transport protocols), and updating the packet to be sent.

Those skilled in the art will appreciate, upon reading this description, that one or more NAT virtual interfaces can be used in parallel between one or more networked devices. A device may, for example, use one virtual interface for communication with one peer and a second virtual interface to communicate with a second peer. As such, each peer might have a unique transport layer state at any given time. Furthermore, one or more virtual interfaces may be used for communication with a single peer device. This capability would enable different network streams between the same endpoints to utilize different transport protocols.

Two NAT virtual interfaces may be used to facilitate multipath routing between two hosts. Consider for example a centralized routing server that provides a virtual private network (VPN) to a client routing device such as a smartphone. The device may utilize a standard TCP connection for communication with the virtual private network when the client device is on a Wi-Fi network. When the client device transitions to a multi-hop wireless or mesh network, the centralized routing facility and the client device employ NAT virtual interfaces that support both TCP and a transport layer customized for multi-hop transmission.

When the client transitions from the Wi-Fi network to the multi-hop network, the NAT virtual interfaces between the client and the server perform a state change between TCP and the custom multi-hop transport protocol. Additional information encoded in the IP address space is used to facilitate the state change and communicate the changes in state between the client device and the centralized routing service.

IP Relays in a Virtualized Network

It follows from both the virtual network and virtual interface functions outlined above that exemplary embodiments hereof enable a new type of content-relay network. A central routing service can itself participate in a virtualized network of routing servers that intelligently use a fixed IP address space for routing among multiple routing servers and clients.

Figure 16:
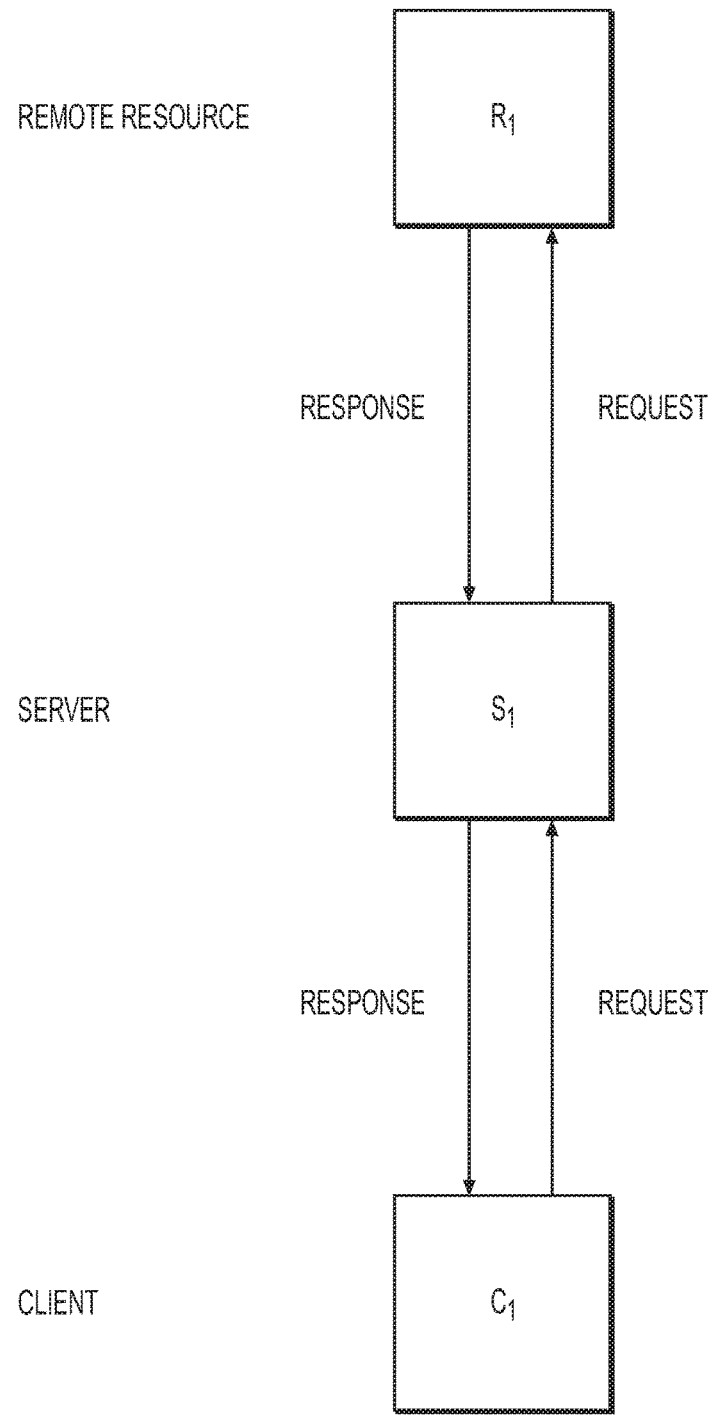
FIG. 16 depicts aspects of a standard networking model.

In a standard networking model such as shown in FIG. 16, a central routing server receives a request for a resource located elsewhere on the network (e.g., the Internet). The request may be in the form of a network packet or inferred from the addressing of the packet itself. The server connects to the resource on the client's behalf, repeats the request to the resource, and receives the response, which it relays in real time to the requesting client. It should be appreciated that when implemented both as a transport layer proxy and a network layer router, the routing server is responsible for relaying all traffic between the client and the destination. Because the server initiates and maintains the second half of the client-to-resource connection, it must exchange all traffic involved.

When scaling an IP network with these properties, geography, limits on computer processing time or memory, and other factors may limit the speed and performance of this network configuration. When resources become constrained in the central routing service, service interruption is possible for all open connections.

To mitigate this, a virtualized network layer is deployed to anchor the server-to-resource portion of the connection. This enables a centralized routing service to use one or more routing devices inside the routing service's virtual network. As such, the remote resource is only aware of a single endpoint inside the virtual network. The other endpoint of the routing device inside the virtualized network may in fact be managed or transitioned between multiple routing devices internally.

Figure 17:
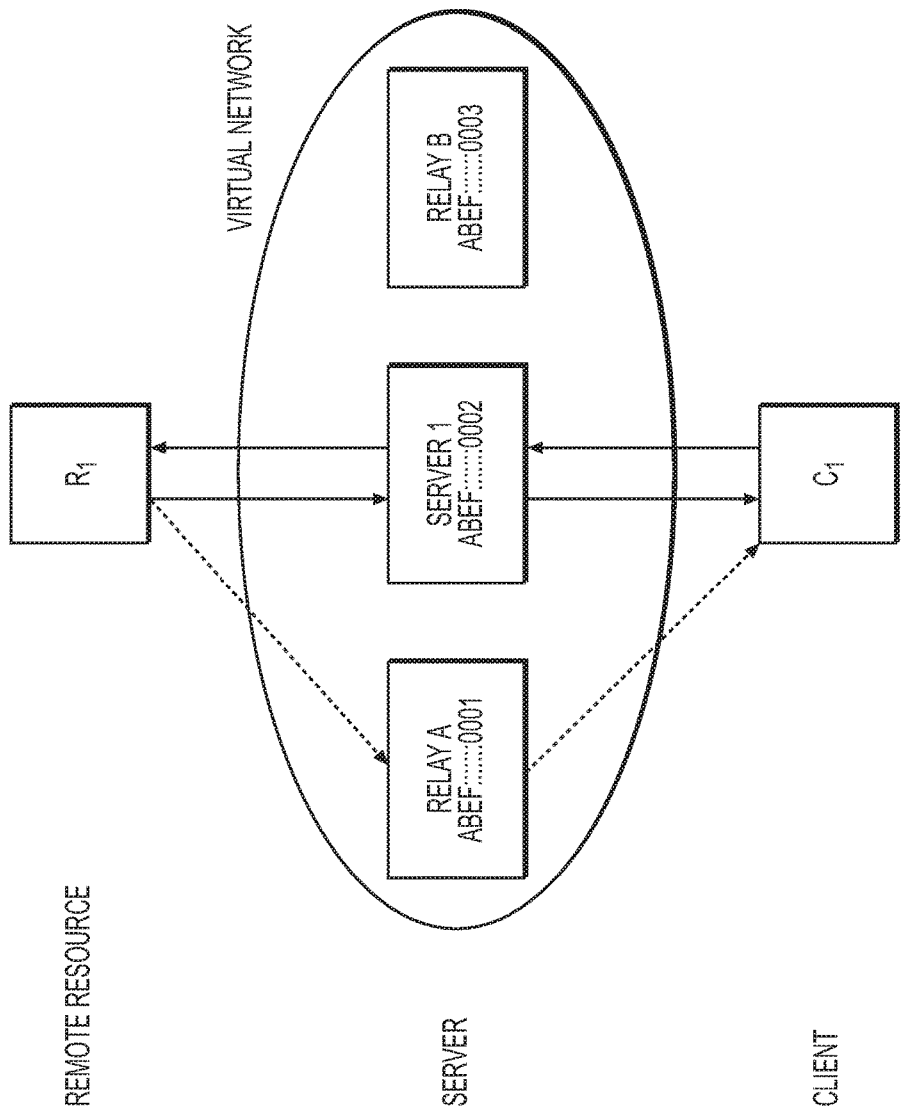
FIG. 17 depicts aspects of a content relay network according to exemplary embodiments hereof.

In this scheme, e.g., as shown in FIG. 17, a remote resource maintains a single connection point into the virtual network as in a virtual private network. The internal virtual network is designed in such a way that relaying devices inside the virtual network handle traffic targeted for particular clients by dividing the traffic over multiple routing devices internally.

Example 7: Scaling a Large IPv6 Network Through Virtualization and Encoding of Parameters in the IPv6 Address Space Consider a large content relay network that communicates with nine (9) independent clients and a remote resource.

Figure 18:
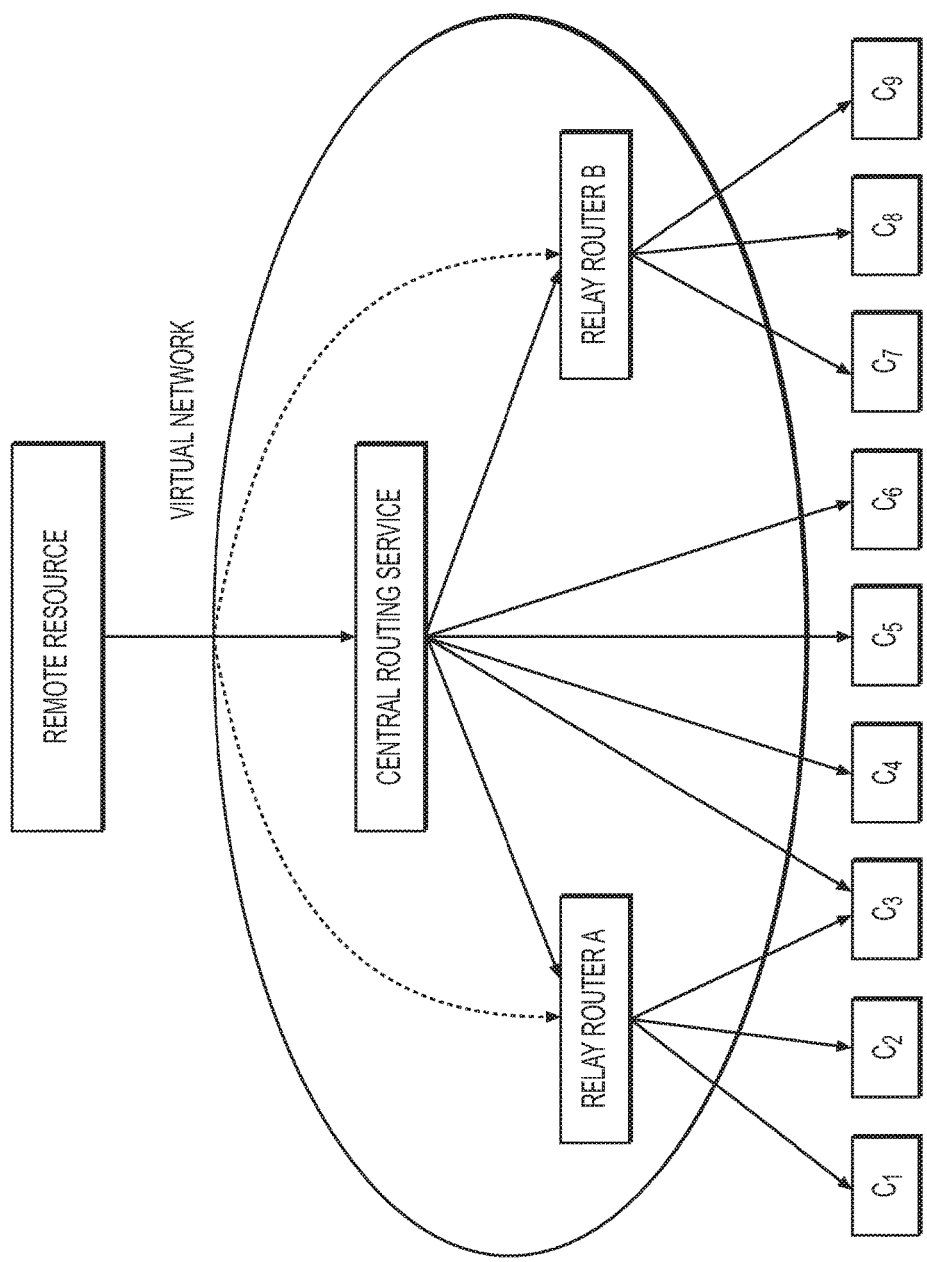
FIGS. 18-21 depict aspects of operation of a content relay network according to exemplary embodiments hereof.

The network consists of a central routing service, two relaying routers, a remote resource, and nine (9) clients (denoted C1-C9) as shown in FIG. 18.

The centralized routing service is configured to allow relaying routers A and B to take over routing data for clients C1-C3, and clients C7-C9, respectively. Such a system can be set up through the means of spoofing the IP source address of outbound packets sent to the remote resource.

In this approach, a routing server receives a request for a resource located outside the virtual network on the Internet. The server opens a connection to the resource on the client's behalf Spoofing Source Addresses for Intra-Site Load-Balancing In one exemplary method to implement this system, the server spoofs as the connection's source address that of the local Relay A or one of the set of local relays of its choosing.

Figure 19:
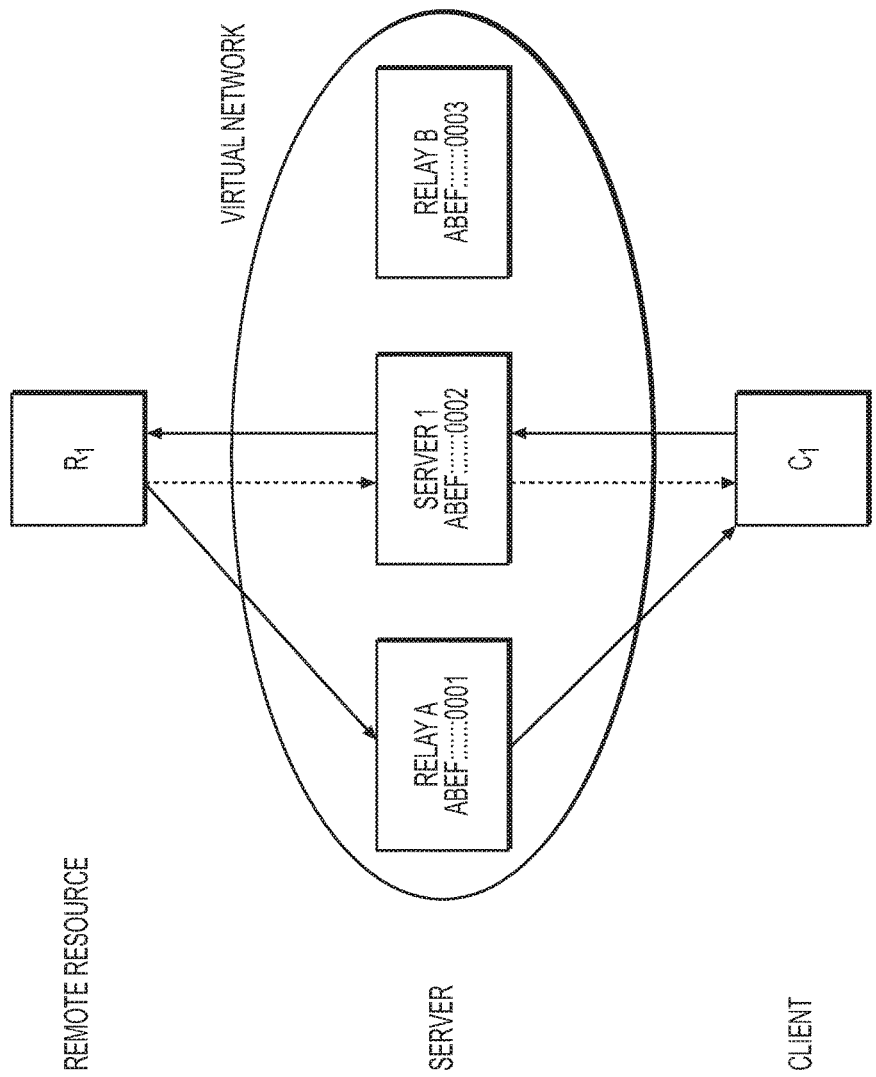

In the simplified diagram FIG. 19 of the network of FIG. 18, Relay A, Server 1, and Relay B have IPv6 addresses ABEF::::::0001, ABEF::::::0002, and ABEF::::::0003, respectively. The non-specified middle portions of the IPv6 address are omitted for clarity.

Using the routing service's facility for communicating among its components, the server informs Relay A of the connection in progress, which the relay picks up as though the relay had initiated it. For a TCP connection, for example, before repeating the client's request to the resource, the relay expects the second leg of the TCP handshake corresponding to the first leg already sent to the resource by the server. The server has more latitude in how and when to transfer control of a UDP conversation to the relay.

The server may likewise notify the client of the connection pending at the relay, to which the client may connect to receive the response to its request. The service thereby handles the client's request using the relay's favorable network resources and without adding to the server's workload.

Figure 20:
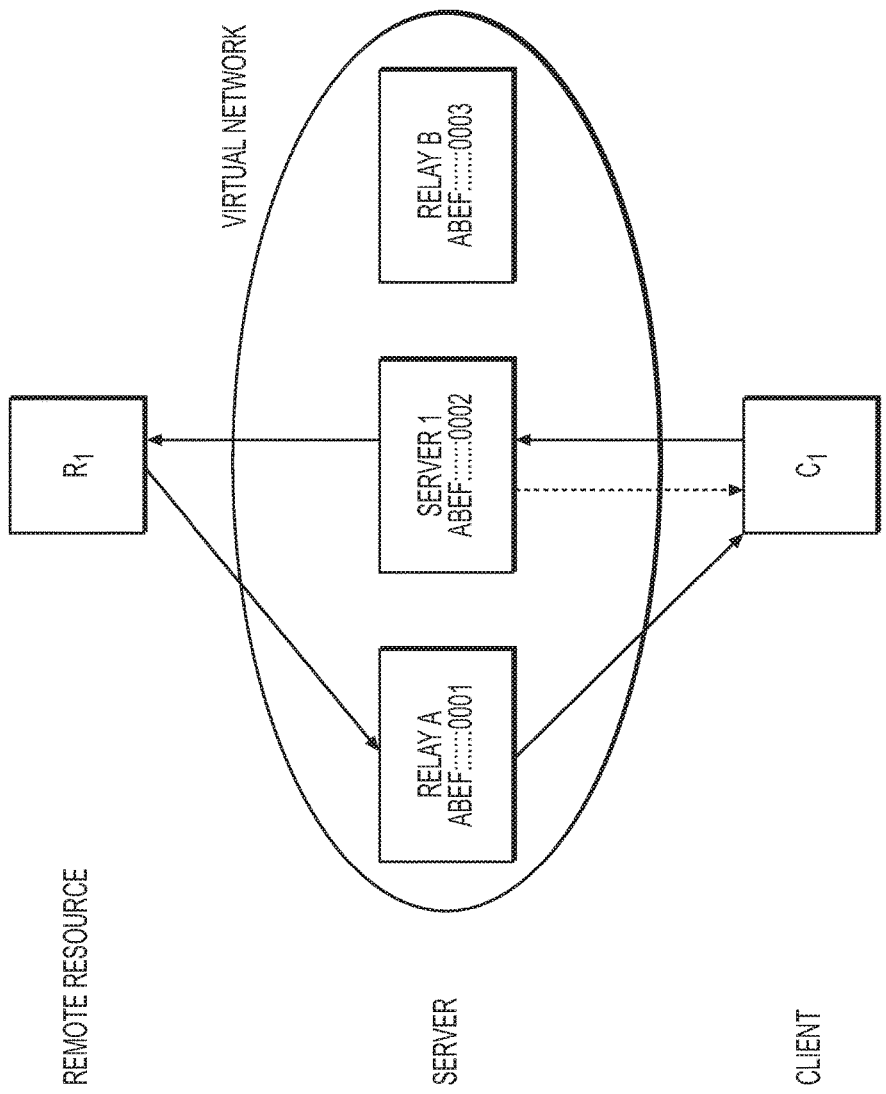

As shown in FIG. 20, when Server 1 sends a resource request out of the virtual network, it spoofs the source address of the packet with the address of the intended relay Relay A. This corresponds to the address ABEF::::::0001. As a result, when resource R1 responds with the requested resource, it will use the source IP address ABEF::::::0001 which will be routed inside the virtual network to Relay A. Relay A routes that packet to client C1.

The relay's network resources may be considered favorable according to criteria at the discretion of the service's operator. A likely criterion is the efficiency of the relay's connection to the Internet, its raw throughput, the cost to the operator, the availability of cross-connect or peering arrangements with relevant other services, or some combination of these and/or other factors.

Those of ordinary skill in the art will realize and appreciate, upon reading this description, that because this method of load balancing can be performed within a single site's instance of the service, it requires no special accommodation by the operator's upstream providers. The server may safely spoof as source addresses the addresses of any of its local relays, which are neighbor nodes on the server's network and announced as part of the same BGP prefix as a single autonomous system.

Those of ordinary skill in the art will further realize and appreciate, upon reading this description, that communication between the central routing service Server 1 and the relaying devices Relay A and Relay B may occur through the use of identifying information encoded in the source address of IP packet. For instance, in a virtual network where the operator had reserved the ABEF/112 netblock for use inside the virtual network, the additional bytes of address space would be used to communicate information about the connected client or target relay.

In exemplary embodiments hereof, the central routing service Server 1 may reserve the second octet of the source address space as a client identifier:

Address Format
ABEF:{client identifier}/96
Route data to Relay A for client 1
ABEF:0001::::::0001
Route data to Relay B for client 2
ABEF:0002::::::0003

The remote resource R1 will behave as if any information encoded in the source address of the resource request is part of the IP address. As a result, remote resource R1 will relay client state information back into the virtual network.

Upon receiving an IP packet with a destination address of the form ABEF:0001::::::0001, Relay A can infer from the client state information 0001 that the central routing service Server 1 has intended client C1 to be handled by Relay A. This is because the eighth octet (0001) matches the local address of Relay A, the second octet (0001) contains a client identifier of 1, and the packet was routed inside the internal ABEF/112 netblock. This is enough information for Relay A to take over relaying data through the virtual network back to the client.

At this point, Server 1 may continue to handle data requested by client C1, or may choose to transition management of the client entirely to Relay A dependent on the network state, its current loading, or other factors. This transition occurs when Server 1 initiates a handoff of client C1 to Relay A over a control channel Client C1 is notified, either by Server 1 or Relay A by way of information encoded in IPv6 addresses and/or an out-of-band control connection, of the switch to Relay A. Client 1 then updates its default route to Relay A as shown in FIG. 21.

Figure 21:
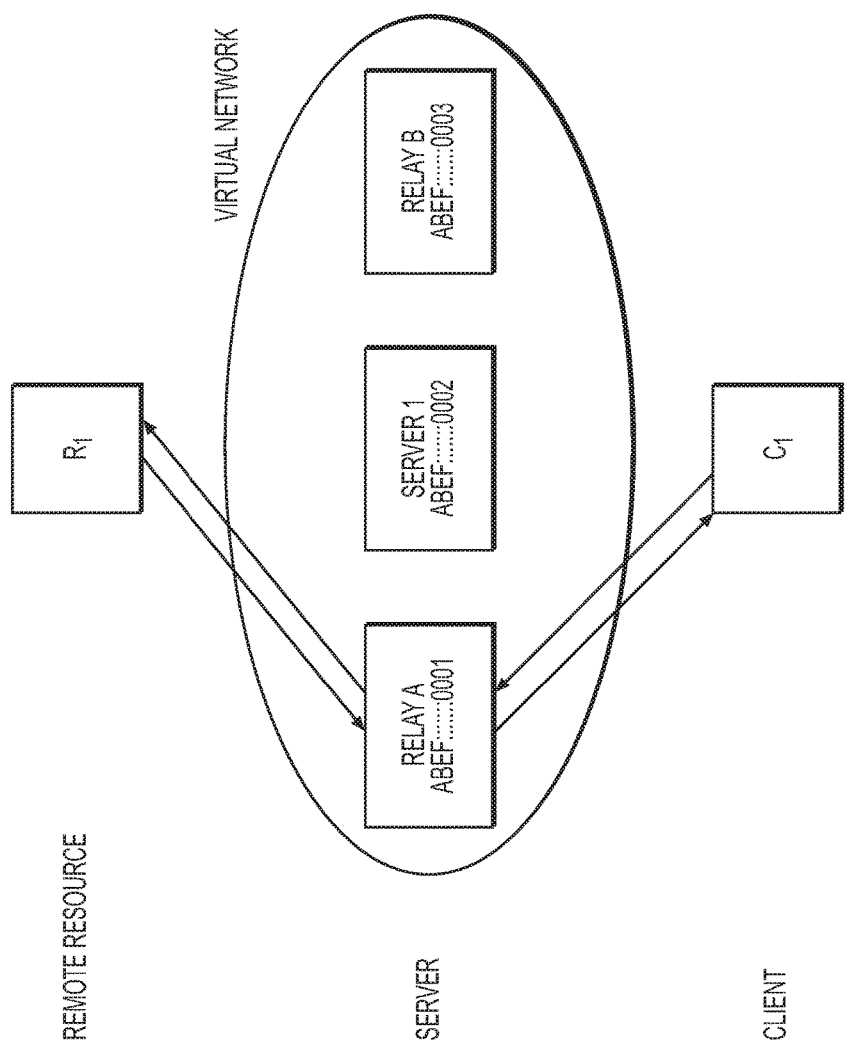

With reference to FIG. 21, after this change, the client C1 has successfully transitioned between Server 1 and Relay A without interruption or change to the connection between remote resource R1 and the virtual network. The data stream between Remote Resource R1 and the virtual network has also transitioned endpoints inside the virtual network: from Server 1 to Relay A. This transition has occurred seamlessly without interruption for Remote Resource R1 because communication still occurs between R1 and the virtual network. The transition instructions and state information encoded in the IPv6 addresses were passively relayed back into the virtual network by R1. Through virtual network components spoofing and encoding information in the source address of outbound packets, R1 facilitates a change of its endpoint inside the virtual network.

Those of ordinary skill in the art will realize and appreciate, upon reading this description, that this procedure generalizes to multiple clients simultaneously. Although the examples have shown all clients and remote resources to be outside the virtual network, the same procedure is applicable to clients and/or resources that are members of the virtual network. Combinations of clients and resources inside and outside the virtual network can also be handled using the above procedure.

Spoofing Source Addresses for Inter-Site Optimization

In a variant on the method just described, a server receives a request for a resource located elsewhere on the Internet. The server maintains a database of such resources according to their proximity, measured in terms of network topology and/or geographical location inferred from network topology. From this database, the server determines which of a set of relays can most favorably receive from the resource the request's response and relay it to the client. The server spoofs as the connection's source address that of the chosen relay as a way of offloading the client's request and response data.

Using the service's facility for communicating among its components, the server informs the relay of the connection in progress, which the relay picks up as though the relay had initiated it. The server likewise notifies the client of the connection pending at this relay, to which the client connects to receive the response to its request. The service thereby handles the client's request using the relay's favorable network resources.

Those of ordinary skill in the art will realize and appreciate, upon reading this description, that because this method of optimization necessarily involves coordinating traffic and connections, some cooperation is required on the part of the operator's upstream providers at all of the sites hosting the service. In particular, the sites must be permitted to announce overlapping prefixes, which are said to be "anycasted." If the prefixes are announced as a single autonomous system, rather than as a distinct autonomous system per anycasted site, that autonomous system is said to be "multi-origin."

The above procedure allows a central routing facility to manage a content relay network where relays are chosen to provide data to clients seamlessly using a virtual network. Relays are chosen based on some optimization criteria, such as their geographical proximity to the client, their availability, or their expected throughput among other factors.

Those of ordinary skill in the art should appreciate that subnets, netblocks, and autonomous systems are all orthogonal to one another. In general, an IP subnet encompasses a set of hosts that are reachable in a single switching domain, without the use of explicit routes or a routing protocol. A "netblock" refers generally to a range of IP addresses assigned to an entity, typically by its Regional Internet Registry (RIR) or ISP. An autonomous system (AS) is an administrative designation for a network or group of networks managed by a single entity. A netblock may be divided into multiple subnets; a subnet may span contiguous netblocks; and an autonomous system may announce routes for all or part of a netblock or for multiple netblocks. In each of these cases, the word "prefix" refers to the specified part of an incomplete address or set of addresses, regardless of how represented (e.g., numerically, bitwise, or as a string).

Computing

The applications, services, mechanisms, operations, and acts shown and described herein are implemented, at least in part, by software running on one or more computers or computer systems or devices. It should be appreciated that each device is, or comprises, a computer system.

Programs that implement such methods (as well as other types of data) may be stored and transmitted using a variety of media (e.g., computer readable media) in a number of ways. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 22:
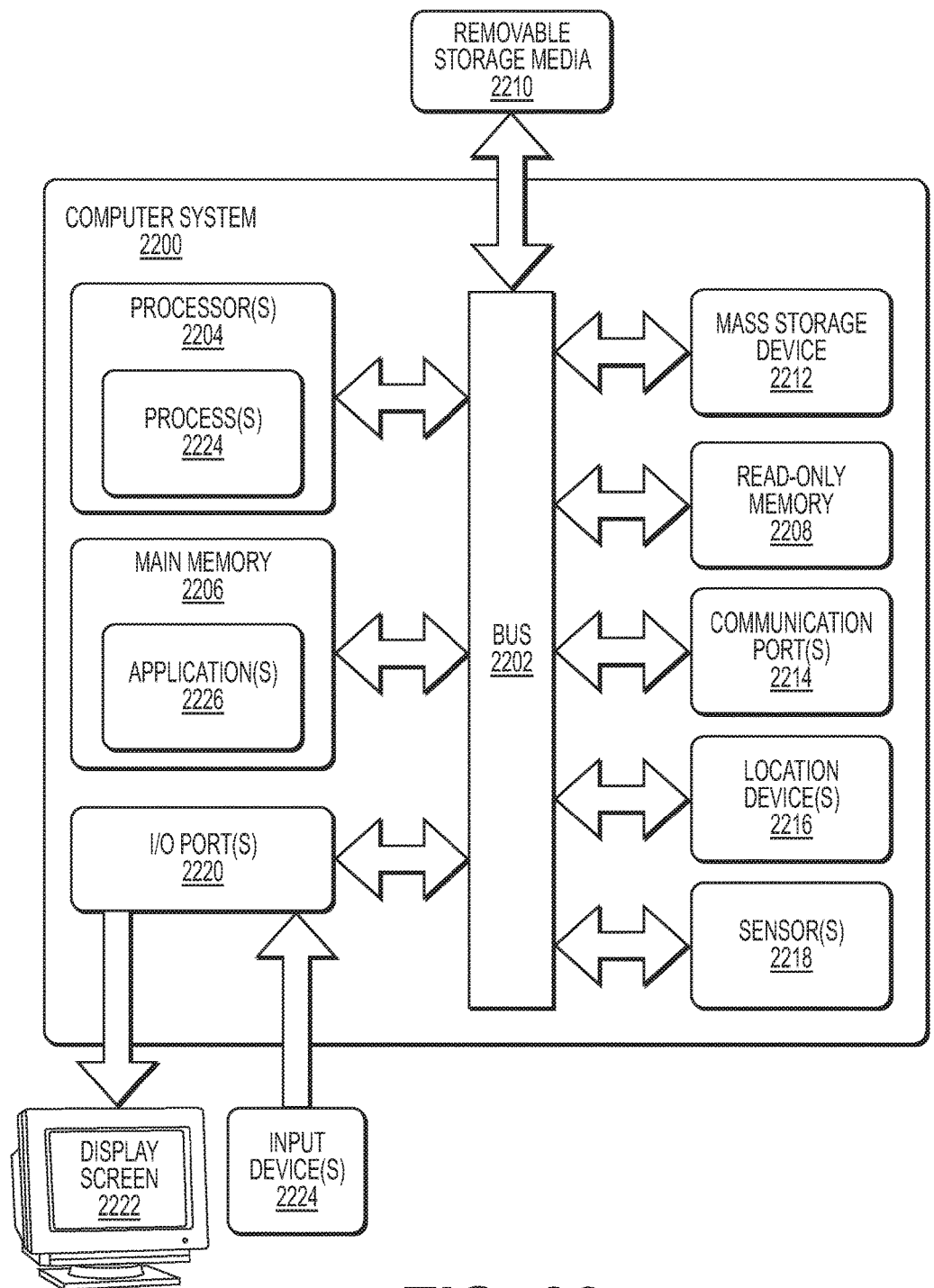
FIG. 22 depicts aspects of a computer system according to exemplary embodiments hereof.

FIG. 22 is a schematic diagram of a computer system 2200 upon which embodiments of the present disclosure may be implemented and carried out.

According to the present example, a computer system 2200 may include a bus 2202 (i.e., interconnect), one or more processors 2204, a main memory 2206, read-only memory 2208, optional removable storage media 2210, a mass storage 2212, one or more communications ports 2214, location device(s) 2216, and one or more sensors 2218. Communication port(s) 2214 may be connected to one or more networks (e.g., computer networks, cellular networks, etc.) by way of which the computer system 2200 may receive and/or transmit data. The location device(s) 2216 may include GPS devices and the like that can be used to determine a location of the device.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 2204 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 2214 can be any of an RS-232 port for use with a modem based dial-up connection, a 10/100 Ethernet port, a Gigabit port using copper or fiber, or a USB port, and the like. Communications port(s) 2214 may be chosen depending on a network such as a Local Area Network (LAN), a Wide Area Network (WAN), a Content Delivery Network (CDN), or any network to which the computer system 2200 connects. The computer system 2200 may be in communication with peripheral devices (e.g., display screen 2222, input device(s) 2224) via Input/Output (I/O) port 2220. Some or all of the peripheral devices may be integrated into the computer system 2200, and the input device(s) 2218 may be integrated into the display screen 2222 (e.g., in the case of a touch screen).

The location device(s) 2216 may include a GPS chipset. The one or more sensors 2218 may include an accelerometer and other sensors to determine information about the device.

Main memory 2206 can be Random Access Memory (RAM), or any other dynamic storage device(s) commonly known in the art. Read-only memory 2208 can be any static storage device(s) such as Programmable Read-only Memory (PROM) chips for storing static information such as instructions for processor(s) 2204. Mass storage 2212 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 2202 communicatively couples processor(s) 2204 with the other memory, storage, and communications blocks. Bus 2202 can be a PCI/PCI-X, SCSI, a Universal Serial Bus (USB) based system bus (or other) depending on the storage devices used, and the like. Removable storage media 2210 can be any kind of external hard drives, Compact Disc-Read-Only Memory (CD-ROM), Compact Disc-Re-Writable (CD-RW), Digital Versatile Disk-Read-Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor, or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire, and fiber optics, including the wires that comprise a system bus coupled to the processor. Transmission media may include or convey acoustic waves; light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards, or protocols; and/or (iv) encrypted in any of a variety of ways well known in the art.

A computer-readable medium can store (in any appropriate format) those program elements that are appropriate to perform the methods.

As shown, main memory 2206 is encoded with application(s) 2226 that support(s) the functionality as discussed herein (an application 2226 may be an application that provides some or all of the functionality of one or more of the mechanisms described herein). Application(s) 2226 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 2204 accesses main memory 2206, e.g., via the use of bus 2202 in order to launch, run, execute, interpret or otherwise perform the logic instructions of the application(s) 2226. Execution of application(s) 2226 produces processing functionality of the service(s) or mechanism(s) related to the application(s). In other words, the process(es) 2224 represents one or more portions of the application(s) 2226 performing within or upon the processor(s) 2204 in the computer system 2200.

For example, process(es) 2224 may include device process(es) corresponding to one or more of the device application(s) 2222.

It should be appreciated that, in addition to the process(es) 2224 that carries(carry) out operations as discussed herein, other embodiments herein include the application 2222 (i.e., the un-executed or non-performing logic instructions and/or data). The application 2222 may be stored on a computer readable medium (e.g., a repository) such as a disk or in an optical medium. According to other embodiments, the application 2222 can also be stored in a memory type system such as in firmware, read-only memory (ROM), or, as in this example, as executable code within the main memory 2206 (e.g., within Random Access Memory or RAM). For example, application 2222 may also be stored in removable storage media 2210, read-only memory 2208, and/or mass storage device 2212.

Those skilled in the art will realize and understand that the computer system 2200 can include other processes and/or software and hardware components, such as an operating system that controls allocation and use of hardware resources.

As discussed herein, embodiments hereof include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware, or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Real Time

Those of ordinary skill in the art will realize and understand, upon reading this description, that, as used herein, the term "real time" means near real time or sufficiently real time. It should be appreciated that there are inherent delays in network-based communication (e.g., based on network traffic and distances), and these delays may cause delays in data reaching various components. Inherent delays in the system do not change the real-time nature of the data. In some cases, the term "real-time data" may refer to data obtained in sufficient time to make the data useful for its intended purpose.

Although the term "real time" may be used here, it should be appreciated that the system is not limited by this term or by how much time is actually taken. In some cases, real time computation may refer to an online computation, i.e., a computation that produces its answer(s) as data arrive, and generally keeps up with continuously arriving data. The term "online" computation is compared to an "offline" or "batch" computation.

As used herein, including in the claims, the term "portion" means some or all. So, for example, "A portion of X" may include some of "X" or all of "X." In the context of a conversation, the term "portion" means some or all of the conversation.

As used herein, including in the claims, the term "including" means "including, without limitation"; or "including, but not limited to," and "includes" means "includes, without limitation," or "includes, but is not limited to."

As used herein, including in the claims, the phrase "at least some" means "one or more," and includes the case of only one. Thus, e.g., the phrase "at least some ABCs" means "one or more ABCs," and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only," the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only," the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs."

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A device comprising hardware, including at least one processor and a memory, the device operable in a packet network, the device constructed to:

(a) receive an internet protocol (IP) packet, said IP packet including an IP address and a payload, distinct from said IP address, wherein said IP address comprises at least (i) addressing information, and (ii) other information distinct from said addressing information, wherein said addressing information is sufficient to identify at least one device in said packet network; and (b) route and/or consume said IP packet based on (x) said addressing information, and (y) said other information; and (c) modify said IP packet to produce a modified IP packet based on said other information, wherein routing in (b) uses said modified IP packet, wherein modifying said IP packet comprises assigning a channel to said IP packet, and wherein said channel is assigned based on frequency availability in a service area of the device.

2. The device of claim 1, wherein said other information includes an address of a target gateway device and wherein said device routes and/or consumes said IP packet in (b) via said target gateway device.

3. The device of claim 2 wherein said other information includes channel identification information, and wherein said device routes and/or consumes said IP packet in (b) via said target gateway device based on said addressing information and on said channel identification information.

4. The device of claim 3 wherein said addressing information comprises first bits of addressing information and wherein said other information comprises second bits distinct from said first bits of addressing information.

5. The device of claim 4 wherein said first bits of addressing information comprise 64 bits and said second bits comprise 64 bits.

6. The device of claim 4 wherein said other information comprises an address of said target gateway device.

7. The device of claim 6 wherein said address of said target gateway device comprises a 32-bit address.

8. The device of claim 1 wherein said other information encodes one or more of:
(i) service availability;
(ii) a Media Access Control (MAC) address of a source or destination device;
(iii) path information;
(iv) multi-hop transmission details;
(v) fragmentation information for multihop routing;
(vi) virtual routing information;
(vii) virtual interface information;
(viii) router identification information;
(ix) transport-layer session information;
(x) sequencing or ordering information; and
(xi) acknowledgement information.

9. The device of claim 1, wherein said other information comprises router identification information, and wherein said device routes and/or consumes said IP packet in (b) via a router identified by said router identification information.

10. The device of claim 1, wherein modifying said IP packet in (c) comprises manipulating at least some of the other information in said IP packet.

11. The device of claim 1 wherein said addressing information comprises an IPv4 address.

12. The device of claim 1, wherein said IP address is an IPv6 address.

13. The device of claim 1 wherein said device comprises a wireless access point.

14. The device of claim 1 wherein said device comprises a mobile device.

15. The device of claim 1 wherein said device comprises a centralized routing service.

16. A method, operable on a device comprising hardware, including at least one processor and a memory, the device operable in a packet network, the method comprising:
(a) receiving an internet protocol (IP) packet, said IP packet including an IP address and a payload, distinct from said IP address, wherein said IP address comprises at least (i) addressing information, and (ii) other information distinct from said addressing information, wherein said addressing information is sufficient to identify at least one device in said packet network; and
(b) routing said IP packet based on (x) said addressing information, and (y) said other information; and
(c) modifying said IP packet to produce a modified IP packet based on said other information, wherein said routing uses said modified IP packet, wherein said modifying of said IP packet comprises assigning a channel to said IP packet; and wherein said channel is assigned based on frequency availability in a service area of the device.

17. The method of claim 16 wherein said other information includes an address of a target gateway device and wherein said device routes and/or consumes said IP packet in (b) via said target gateway device.

18. The method of claim 17 wherein said other information includes channel identification information, and wherein said device routes and/or consumes said IP packet in (b) via said target gateway device based on said addressing information and on said channel identification information.

19. The method of claim 18 wherein said addressing information comprises first bits of addressing information and wherein said other information comprises second bits distinct from said first bits of addressing information.

20. The method of claim 19 wherein said first bits of addressing information comprise 64 bits and said second bits comprise 64 bits.

21. The method of claim 19 wherein said other information comprises an address of said target gateway device.

22. The method of claim 21 wherein said address of said target gateway device comprises a 32-bit address.

23. The method of claim 16 wherein said other information encodes one or more of:
(i) service availability;
(ii) a Media Access Control (MAC) address of a source or destination device;
(iii) path information;
(iv) multi-hop transmission details;
(v) fragmentation information for multihop routing;
(vi) virtual routing information;
(vii) virtual interface information; and
(viii) router identification information;
(ix) transport-layer session information;
(x) sequencing or ordering information; and
(xi) acknowledgement information.

24. The method of claim 16, wherein said other information comprises router identification information, and wherein said device routes and/or consumes said IP packet in (b) via a router identified by said router identification information.

25. The method of claim 16 wherein said modifying comprises manipulating at least some of the other information in said IP packet.

26. The method of claim 16 wherein said addressing information comprises an IPv4 address.

27. The method of claim 16, wherein said IP address is an IPv6 address.

28. The method of claim 16, wherein a network interface or virtual network interface configuration is assigned based on identifying information of the network interface's or virtual network interface's device.

29. A device comprising hardware, including at least one processor and a memory, the device operable in a packet network, the device constructed to:
(a) receive an internet protocol (IP) packet, said IP packet including an IP address and a payload, distinct from said IF address, wherein said IP address is an Internet Protocol version 6 (IPv6) address, and wherein said IP address comprises at least (i) addressing information, and (ii) other information distinct from said addressing information, and wherein said addressing information comprises an IPv4 address; and
(b) route and/or consume said IP packet based on (x) said addressing information, and (y) said other information; and
(c) modify said IP packet to produce a modified IP packet based on said other information, wherein routing in (b) uses said modified IP packet,
wherein modifying said IP packet comprises assigning a channel to said IP packet, and wherein said channel is assigned based on frequency availability in a service area of the device.

30. A device comprising hardware, including at least one processor and a memory, the device operable in a packet network, the device constructed to:
(a) receive a packet, said packet including an address section and a payload section, distinct from said address section, wherein said address section comprises 128 bits, wherein (i) a first at least some bits of said address section comprise an address sufficient to identify at least one device in said packet network; and (ii) a second at least some bits of said address section comprise other information distinct from said address; and (b) route and/or consume said packet based on (x) said address, and (y) said other information; and (c) modify said packet to produce a modified packet based on said other information, wherein routing in (b) uses said modified packet, wherein modifying said packet comprises assigning a channel to said packet, and wherein said channel is assigned based on frequency availability in a service area of the device.

31. The device of claim 30, wherein said other information comprises a 32-bit address of a target device, and wherein said device routes and/or consumes said packet in (b) via said target device.

32. The device of claim 30, wherein said address section comprises an IPv6 address, and wherein said other information comprises an IPv4 address.

33. The device of claim 30, wherein said other information encodes one or more of:
 (i) service availability;
 (ii) a Media Access Control (MAC) address of a source or destination device;
 (iii) path information;
 (iv) multi-hop transmission details;
 (v) fragmentation information for multihop routing;
 (vi) virtual routing information;
 (vii) virtual interface information;
 (viii) router identification information;
 (ix) transport-layer session information;
 (x) sequencing or ordering information; and
 (xi) acknowledgement information.

34. A method, operable on a device comprising hardware, including at least one processor and a memory, the device operable in a packet network, the method comprising:

(a) receiving a packet, said packet including an address section and a payload section, distinct from said address section, wherein said address section comprises 128 bits, and wherein (i) at a first at least some bits of said address section comprise addressing information, and (ii) a second at least some bits of said address section comprise other information distinct from said addressing information, wherein said addressing information is sufficient to identify at least one device in said packet network;

(b) routing said packet based on (x) said addressing information, and (y) said other information; and (c) modifying said packet to produce a modified packet based on said other information, wherein said routing uses said modified packet, wherein said modifying of said packet comprises assigning a channel to said packet; and wherein said channel is assigned based on frequency availability in a service area of the device.

35. The method of claim 34, wherein the address section comprises an IPv6 address, and wherein the addressing information comprises an IPv4 address.

* * * * *